US012471086B2

(12) United States Patent
Zhou et al.

(10) Patent No.: US 12,471,086 B2
(45) Date of Patent: Nov. 11, 2025

(54) SYSTEM AND METHOD FOR REPETITION OF SCHEDULING INFORMATION ON A CONTROL CHANNEL

(71) Applicant: QUALCOMM Incorporated, San Diego, CA (US)

(72) Inventors: Yan Zhou, San Diego, CA (US); Tao Luo, San Diego, CA (US); Muhammad Nazmul Islam, Littleton, MA (US); Makesh Pravin John Wilson, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 593 days.

(21) Appl. No.: 17/449,244

(22) Filed: Sep. 28, 2021

(65) Prior Publication Data

US 2022/0124769 A1    Apr. 21, 2022

Related U.S. Application Data

(63) Continuation of application No. 16/428,355, filed on May 31, 2019, now Pat. No. 11,134,511.
(Continued)

(51) Int. Cl.
*H04W 72/20* (2023.01)
*H04W 72/23* (2023.01)
*H04W 74/0833* (2024.01)

(52) U.S. Cl.
CPC ........... *H04W 72/20* (2023.01); *H04W 72/23* (2023.01); *H04W 74/0833* (2013.01)

(58) Field of Classification Search
CPC ........ H04L 1/1671; H04L 1/08; H04W 72/20; H04W 72/23; H04W 74/0833; H04W 72/0446; H04W 72/1273; H04W 74/00
See application file for complete search history.

(56) References Cited

U.S. PATENT DOCUMENTS 10,986,622 B2 *   4/2021   Zhang ................... H04W 72/56
11,134,511 B2 *   9/2021   Zhou .................. H04W 74/0833
(Continued)

FOREIGN PATENT DOCUMENTS

CN          108141728 A     6/2018
EP            3026830 A1     6/2016
(Continued)

OTHER PUBLICATIONS

Certified Patent Document 10-2018-0038146, Apr. 2, 2018 (U.S. Appl. No. 16/789,582); available Apr. 10, 2019 (Year: 2019).*
(Continued)

*Primary Examiner* — Benjamin H Elliott, IV
(74) *Attorney, Agent, or Firm* — Guang Y. Zhang; ArentFox Schiff LLP

(57) ABSTRACT

A first apparatus may determine a first schedule associated with the one or more repetitions of the control information on the control channel based on the first information. The first apparatus may receive, from the network, at least one of the one or more repetitions of the control information on the control channel based on the first schedule, wherein the control information indicates a second schedule associated with a random access response (RAR) on a data channel. The first apparatus may receive, from the network, the RAR on the data channel based on the second schedule.

24 Claims, 19 Drawing Sheets

Related U.S. Application Data

(60) Provisional application No. 62/695,713, filed on Jul. 9, 2018.

(56) References Cited

U.S. PATENT DOCUMENTS

| | | | | |
|---|---|---|---|---|
| 2014/0293903 | A1* | 10/2014 | Kuo | H04W 76/34 |
| | | | | 370/328 |
| 2015/0282215 | A1* | 10/2015 | Eriksson | H04W 74/0833 |
| | | | | 370/329 |
| 2016/0165640 | A1* | 6/2016 | Yang | H04W 72/21 |
| | | | | 370/336 |
| 2016/0227524 | A1* | 8/2016 | Choi | H04L 5/00 |
| 2016/0309475 | A1* | 10/2016 | Wong | H04W 4/70 |
| 2016/0353440 | A1* | 12/2016 | Lee | H04W 52/50 |
| 2017/0142618 | A1* | 5/2017 | Hahn | H04W 36/324 |
| 2018/0054837 | A1* | 2/2018 | Islam | H04W 74/006 |
| 2018/0070403 | A1 | 3/2018 | Uemura et al. | |
| 2018/0084455 | A1* | 3/2018 | Liu | H04W 28/04 |
| 2018/0103459 | A1* | 4/2018 | Liu | H04L 1/0072 |
| 2018/0249508 | A1* | 8/2018 | Gao | H04W 52/0216 |
| 2018/0279186 | A1* | 9/2018 | Park | H04W 36/302 |
| 2019/0028905 | A1* | 1/2019 | Veeramallu | H04W 76/18 |
| 2019/0028923 | A1* | 1/2019 | Futaki | H04W 24/02 |
| 2019/0082431 | A1* | 3/2019 | Yi | H04L 5/0055 |
| 2019/0222400 | A1* | 7/2019 | Bagheri | H04L 5/0082 |
| 2019/0349180 | A1* | 11/2019 | Lu | H04L 27/2607 |
| 2019/0387506 | A1* | 12/2019 | Ugurlu | H04L 5/0091 |
| 2020/0015258 | A1* | 1/2020 | Zhou | H04W 72/20 |
| 2020/0186321 | A1* | 6/2020 | Hwang | H04W 72/23 |
| 2020/0221502 | A1* | 7/2020 | Pjanic | H04W 74/0833 |
| 2022/0124769 | A1* | 4/2022 | Zhou | H04W 72/23 |

FOREIGN PATENT DOCUMENTS

| | | |
|---|---|---|
| TW | 201815109 A | 4/2018 |
| WO | 2015012664 A1 | 1/2015 |
| WO | 2017026971 A1 | 2/2017 |
| WO | 2017052199 A1 | 3/2017 |

OTHER PUBLICATIONS

English translation Korean application publication KR20190115428A; published Nov. 20, 2019 (Year: 2019).*
English translation of Korean application 10-2018-0038146, Apr. 2, 2018 (translated Mar. 17, 2025) (Year: 2025).*
International Preliminary Report on Patentability—PCT/US2019/035217, The International Bureau of WIPO—Geneva, Switzerland, Jan. 21, 2021.
International Search Report and Written Opinion—PCT/US2019/035217—ISA/EPO—Aug. 30, 2019.
Taiwan Search Report—TW108119144—TIPO—Jul. 27, 2022.

* cited by examiner

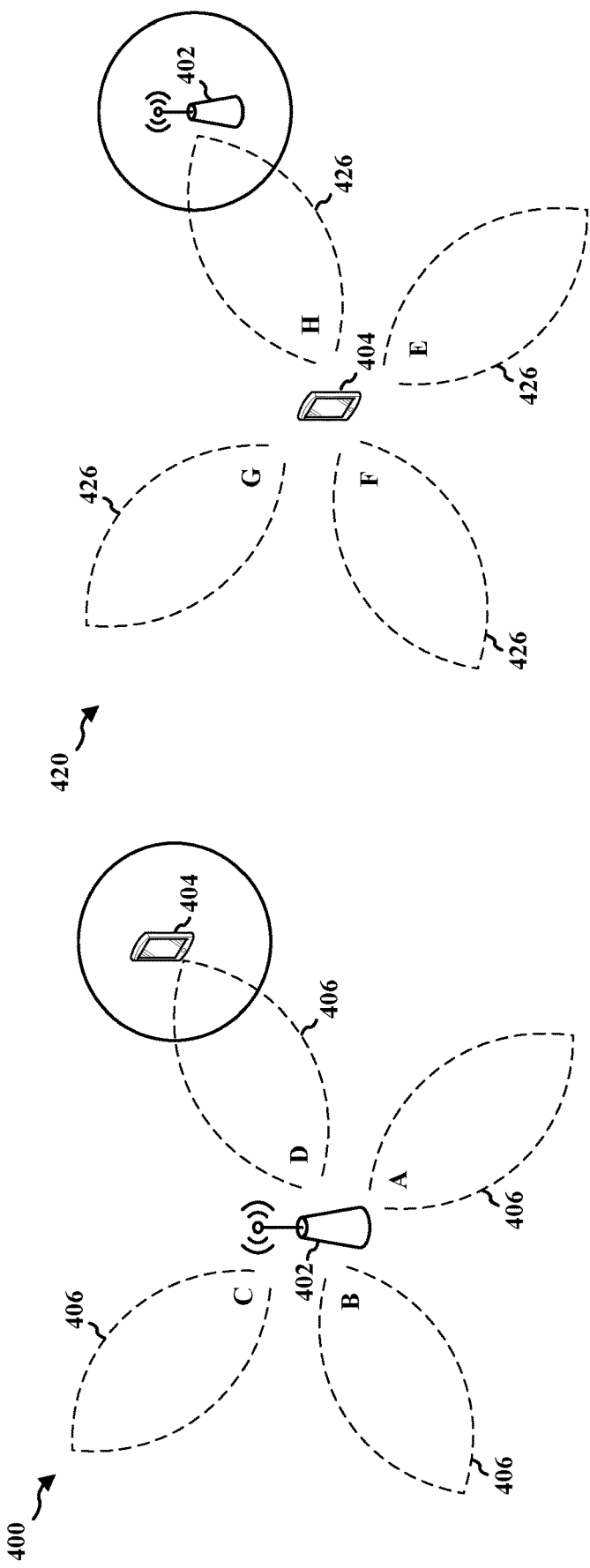

SYSTEM AND METHOD FOR REPETITION OF SCHEDULING INFORMATION ON A CONTROL CHANNEL

CROSS REFERENCE TO RELATED APPLICATION(S)

This application is a Continuation of U.S. application Ser. No. 16/428,355 entitled "SYSTEM AND METHOD FOR REPETITION OF SCHEDULING INFORMATION ON A CONTROL CHANNEL" and filed May 31, 2019, which claims the benefit of U.S. Provisional Application Ser. No. 62/695,713, entitled "SIGNALING OF REPETITION OF A CONTROL CHANNEL" and filed on Jul. 9, 2018, both of which are expressly incorporated by reference herein in their entirety.

BACKGROUND

Technical Field

The present disclosure relates generally to communications systems, and more particularly, to a user equipment configured detect scheduling information on a control channel.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various wireless communications systems, a base station may indicate scheduling information for one channel through another channel. For example, the base station may inform a user equipment (UE) of scheduling for a data channel by sending scheduling information for the data channel on a control channel. Illustratively, the data channel may be a physical downlink shared channel (PDSCH), and the control channel may be a physical downlink control channel (PDCCH).

In some aspects, a slot scheduled for the data channel may be indicated by reference slot and an offset. For example, a slot index of a control channel associated with scheduling for the data channel may be the reference slot, and a slot offset may be added to the reference slot to determine the slot scheduled for the data channel. The base station may signal the slot offset to the UE. Accordingly, the UE may add the slot offset to the slot index of a control channel slot associated with scheduling of the data channel in order to determine the slot scheduled for the data channel. However, the UE may be unable to detect the control channel slot associated with scheduling for the data channel, such as when the UE is near a cell edge, when the UE experiences interference, and so forth. Therefore, a need exists to improve the detection of scheduling information for a data channel indicated on a control channel.

In some aspects of the present disclosure, the base station may repeatedly send information on a control channel that indicates scheduling for the data channel. However, when the base station repeatedly sends scheduling information on control channel slots for a data channel, then the slot index of one of those control channel slots may be unusable as a reference slot, e.g., because multiple control channel slots indicate the same scheduling information for the data channel. Therefore, one or more rules may define how a UE is to determine a slot index scheduled for a data channel when scheduling information for the data channel is repeatedly indicated across a plurality of control channel slots.

In a first aspect of the disclosure, a first method, a first computer-readable medium, and a first apparatus are provided. The first apparatus may be a UE. The first apparatus may determine a first schedule associated with the one or more repetitions of the control information on the control channel based on the first information. The first apparatus may receive, from the network, at least one of the one or more repetitions of the control information on the control channel based on the first schedule, wherein the control information indicates a second schedule associated with a random access response (RAR) on a data channel. The first apparatus may receive, from the network, the RAR on the data channel based on the second schedule.

In one aspect, the first information indicates whether the one or more repetitions of the control information on the control channel is greater than one. In another aspect, the first information indicates each of the one or more repetitions of the control information on the control channel has at least one of a same payload, a same aggregation level, or a same set of frequency resources. In a further aspect, the first information comprises a flag indicated by a search space information element (IE), and at least two of the one or more repetitions of the control information on the control channel are across adjacent slots per monitoring occasion. In still another aspect, the first information comprises a number of symbols associated with the one or more repetitions of the control information on the control channel, and wherein a search space associated with the control channel comprises a number of symbols per monitoring occasion that is a multiple of a control resource set (CORESET) carrying the control information on the control channel, and at least two of the one or more repetitions of the control information on the control channel are across adjacent symbols per monitoring occasion.

In one aspect, the first information indicates a start time and a number of the one or more repetitions of the control information on the control channel for one or more time windows that include each of the one or more repetitions of the control information on the control channel. In one aspect, at least two of the one or more repetitions of the control information on the control channel included in the one or more time windows are across adjacent slots or adjacent symbols.

In one aspect, the first information is received via at least one of radio resource control (RRC) signaling, a media access control (MAC) control element (CE), or a downlink control information (DCI) message. In another aspect, the first information is received on a first set of frequency resources that is different from a second set of frequency resources on which each of the one or more repetitions of the control information on the control channel is received. In an further aspect, the first information indicates one or more indices associated with at least one common monitoring occasion that includes the one or more repetitions of the control information on the control channel, and the first information further indicates a number of the one or more repetitions of the control information on the control channel included in at least one common monitoring occasion. In yet another aspect, the at least one common monitoring occasion is associated with a respective schedule that is defined by a common search space configuration. In one aspect, the common search space configuration is indicated in at least one of a system information block (SIB) or an IE associated with a configuration of common parameters associated with the control channel.

In one aspect, the first information is indicated in at least one UE-specific IE. In one aspect, at least two of the one or more repetitions of the control information on the control channel during at least one common monitoring occasion are across one of adjacent slots or adjacent symbols. In one aspect, the control channel comprises a PDCCH, and the data channel comprises a PDSCH.

In a second aspect of the disclosure, a second method, a second computer-readable medium, and a second apparatus are provided. The second apparatus may be a base station. The second apparatus may determine, for a UE, a first schedule associated with one or more repetitions of control information on a control channel. The apparatus may send, to the UE, first information indicating the first schedule. The apparatus may send, to the UE, each of the one or more repetitions of the control information on the control channel based on the first schedule, wherein the control information indicates a second schedule associated with a RAR on a data channel.

In one aspect, the apparatus may send, to the UE, the RAR on the data channel based on the second schedule associated with the RAR. In another aspect, the apparatus may configure a second base station for the UE, wherein the second base station is to send the RAR to the UE on the data channel based on the second schedule associated with the RAR.

In one aspect, a number of the one or more repetitions of the control information on the control channel is determined based on at least one of a RACH preamble received from the UE or a measurement report received from the UE.

In one aspect, the determination of the first schedule associated with the one or more repetitions of the control information on the control channel comprises to determine whether at least one value included in the measurement report satisfies at least one threshold, and determine the number of the one or more repetitions of the control information on the control channel based on whether the at least one value included in the measurement report satisfies the at least one threshold.

In one aspect, the first information indicates whether a number of the one or more repetitions of the control information on the control channel is greater than one. In another aspect, the first information indicates each of the one or more repetitions of the control information on the control channel has at least one of a same payload, a same aggregation level, or a same set of frequency resources. In a further aspect, the first information comprises a flag indicated by a search space IE, and at least two of the one or more repetitions of the control information on the control channel are across adjacent slots per monitoring occasion.

In one aspect, the first information comprises a number of symbols associated with the one or more repetitions of the control information on the control channel, and wherein a search space associated with the control channel comprises a number of symbols per monitoring occasion that is a multiple of a CORESET carrying the control information on the control channel, and at least two of the one or more repetitions of the control information on the channel are across adjacent symbols per monitoring occasion. In another aspect, the first information indicates a start time and a number of the one or more repetitions of the control information on the control channel for one or more time windows that include the one or more repetitions of the control information on the control channel. In an further aspect, at least two of the one or more repetitions of the control information on the control channel included in the one or more time windows are across one of adjacent slots or adjacent symbols.

In one aspect, the first information is sent via at least one of RRC signaling, a MAC CE, or a DCI message. In another aspect, the first information is sent one a first set of frequency resources that is different from a second set of frequency resources on which the one or more repetitions of the control information on the control channel is sent.

In one aspect, the first information indicates one or more indices associated with at least one common monitoring occasion that includes the one or more repetitions of the control information on the control channel, and the first information further indicates a number of the one or more repetitions of the control information on the control channel included in at least one common monitoring occasion. In a further aspect, the at least one common monitoring occasion is associated with a respective schedule that is defined by a common search space configuration. In still a further aspect, the common search space configuration is indicated by at least one of a SIB or an IE associated with a configuration of common parameters associated with the control channel. In another aspect, the first information is indicated in at least one UE-specific IE. In another aspect, at least two of the one or more repetitions of the control information on the control channel during at least one common monitoring occasion are across one of adjacent slots or adjacent symbols. In one aspect, the control channel comprises a PDCCH, and the data channel comprises a PDSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A and 4B are diagrams illustrating a wireless communications system, in accordance with various aspects of the present disclosure.

DETAILED DESCRIPTION

Figure 1:
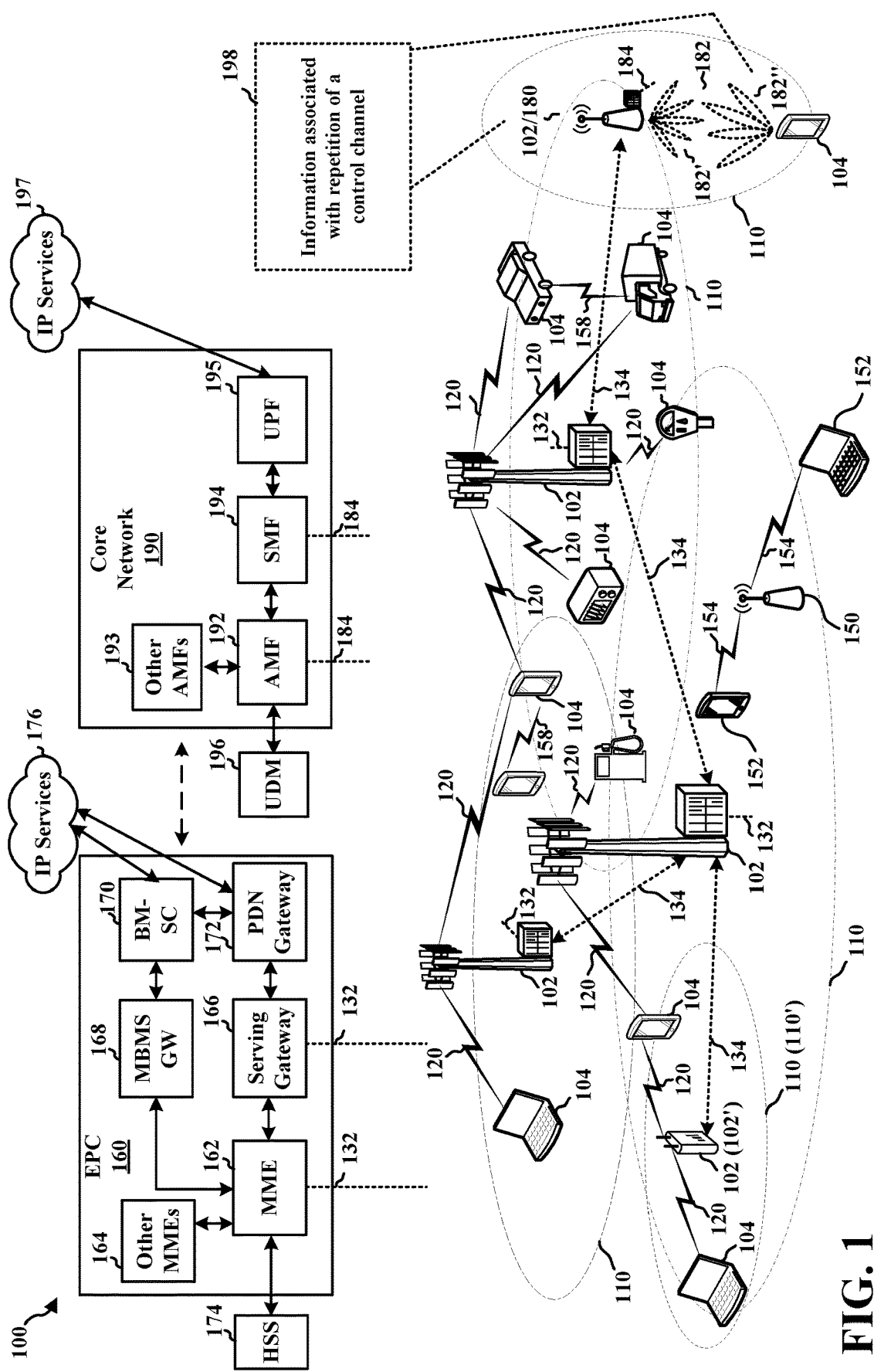
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure and accompanying drawings may be focused on 5G New Radio (NR), the concepts described herein may be applicable to other similar areas, such as LTE, LTE-Advanced (LTE-A), Code Division Multiple Access (CDMA), Global System for Mobile communications (GSM), and/or other wireless/radio access technologies.

Referring again to FIG. 1, in certain aspects, a first base station 102/180 may determine, for a UE 104, a first schedule associated with one or more repetitions of control information on a control channel. The first base station 102/180 may send, to the UE 104, first information indicating the first schedule (198).

The UE 104 may receive, from a base station 102/180, the first information associated with the one or more repetitions of the control information on the control channel (198). The UE 104 may determine the first schedule associated with the one or more repetitions of the control information on the control channel based on the first information (198).

The first base station 102/180 may send, to the UE 104, each of the one or more repetitions of the control information on the control channel based on the first schedule. The control information may indicate a second schedule associated with a random access response (RAR) on a data channel.

The UE 104 may receive at least one of the one or more repetitions of the control information on the control channel based on the first schedule. From the control information, the UE 104 may determine the second schedule associated with the RAR on the data channel.

The UE 104 may then receive the RAR on the data channel based on the second schedule. In one aspect, the first base station 102/180 may send the RAR on the data channel to the UE 104 and, therefore, the UE 104 may receive the RAR on the data channel from the first base station 102/180. In another aspect, the first base station 102/180 may configure a second base station (e.g., a small cell 102') to send the RAR on the data channel and, therefore, the UE 104 may receive the RAR on the data channel from the second base station (e.g., the small cell 102').

Figure 2:
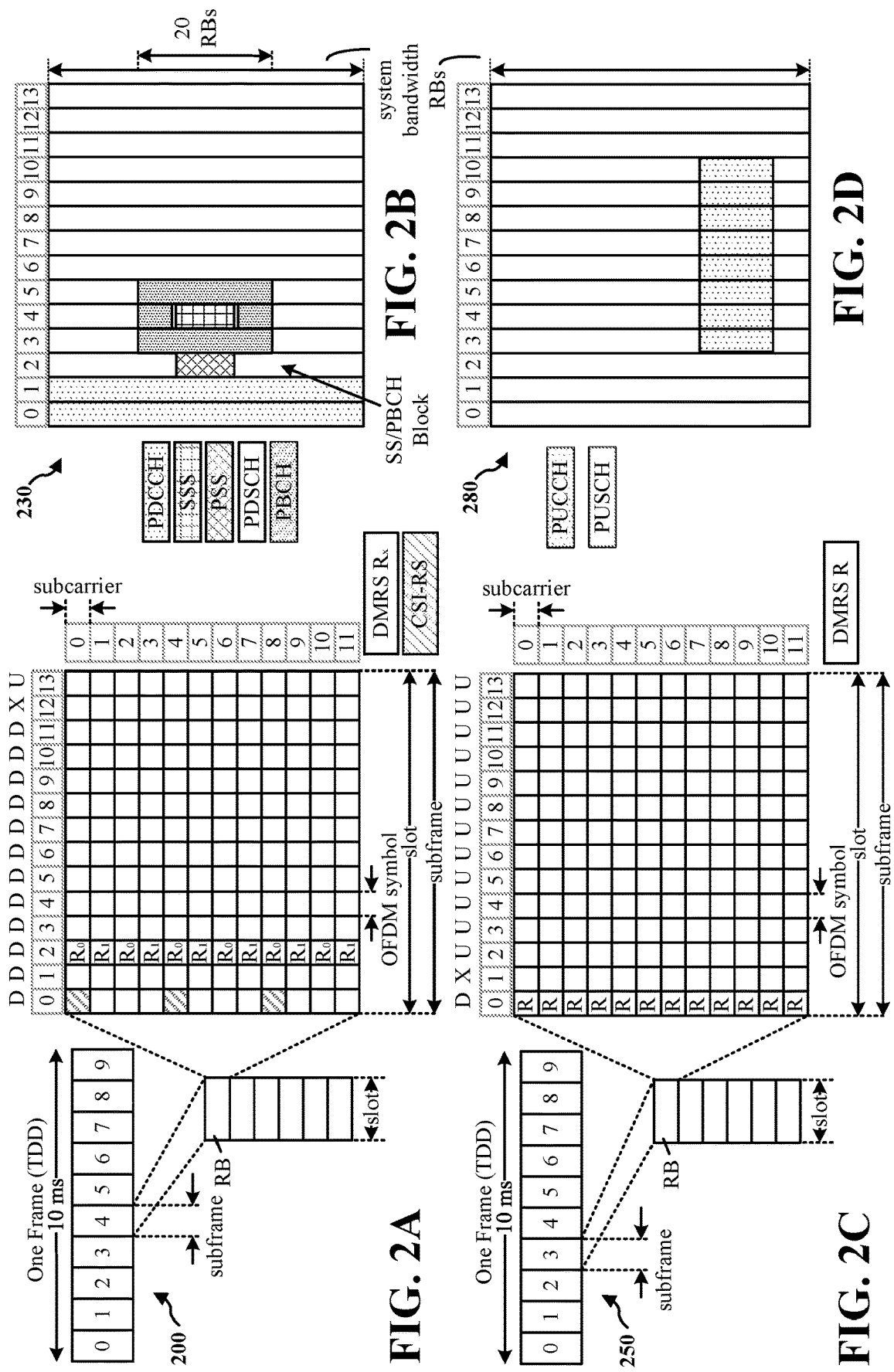
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, in accordance with various aspects of the present disclosure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $2^\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
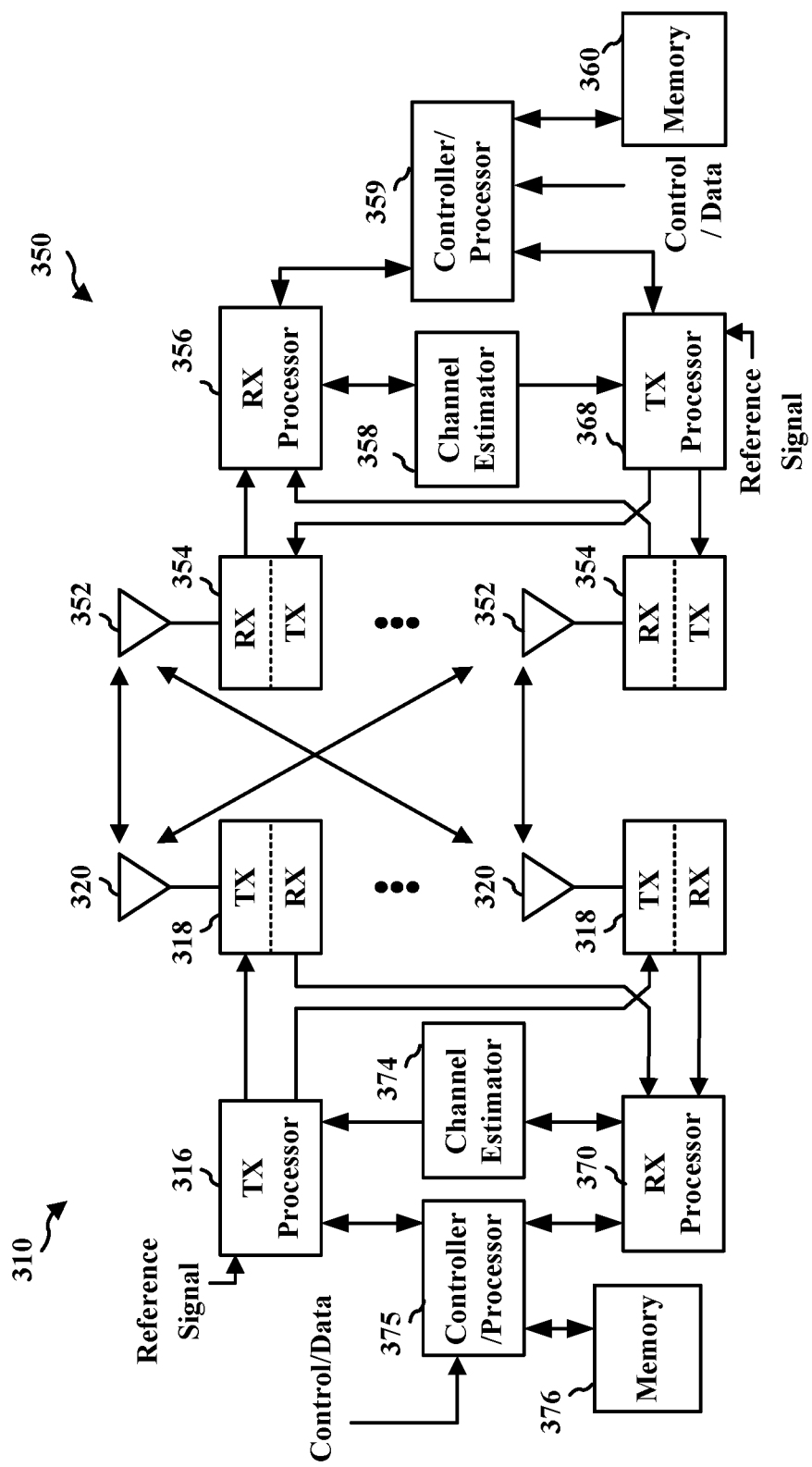
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with (198) of FIG. 1. For example, the RX processor 356 may be configured to receive, from the base station 310, first information associated with one or more repetitions of control information on a control channel. The controller/processor 359 may be configured to determine a first schedule associated with the one or more repetitions of the control information on the control channel based on the first information. The RX processor 356 may be further configured to receive, from the base station 310, the control information on the control channel based on the first schedule, and the control information may indicate a second schedule associated with an RAR on a data channel. The RX processor 356 may be further configured to receive the RAR on the data channel based on the second schedule.

Further, at least one of the TX processor 316, the RX processor 370, and the controller/processor 375 may be configured to perform aspects in connection with (198) of FIG. 1. For example, the controller/processor 375 may be configured to determine, for the UE 350, the first schedule associated with the one or more repetitions of the control information on the control channel. The TX processor 316 may be configured to send, to the UE 350, the first information indicating the first schedule. The TX processor 316 may be further configured to send, to the UE 350, each of the one or more repetitions of the control information on the control channel based on the first schedule, and the control information may indicate a second schedule associated with the RAR on the data channel. In some aspects, the TX processor 316 may be further configured to send, to the UE 350, the RAR on the data channel based on the second schedule associated with the RAR. In some other aspects, the controller/processor 375 and/or the TX processor 316 may be further configured to configure a second base station (e.g., a small cell base station) to send the RAR to the UE on the data channel based on the second schedule associated with the RAR.

FIGS. 4A and 4B are diagrams illustrating an example of the transmission of beamformed signals between a base station (BS) and a UE. The base station may be embodied as a base station in a mmW system (mmW base station). Referring to FIG. 4A, diagram 400 illustrates a base station 402 of a mmW system transmitting beamformed signals 406 (e.g., beam reference signals) in different transmit directions (e.g., directions A, B, C, and D). In an example, the base station 402 may sweep through the transmit directions according to a sequence A-B-C-D. In another example, the base station 402 may sweep through the transmit directions according to the sequence B-D-A-C. Although only four transmit directions and two transmit sequences are described with respect to FIG. 4A, any number of different transmit directions and transmit sequences are contemplated.

After transmitting the signals, the base station 402 may switch to a receive mode. In the receive mode, the base station 402 may sweep through different receive directions in a sequence or pattern corresponding (mapping) to a sequence or pattern in which the base station 402 previously transmitted the synchronization/discovery signals in the different transmit directions. For example, if the base station 402 previously transmitted the synchronization/discovery signals in transmit directions according to the sequence A-B-C-D, then the base station 402 may sweep through receive directions according to the sequence A-B-C-D in an attempt to receive an association signal from a UE 404. In another example, if the base station 402 previously transmitted the synchronization/discovery signals in transmit directions according to the sequence B-D-A-C, then the base station 402 may sweep through receive directions according to the sequence B-D-A-C in an attempt to receive the association signal from the UE 404.

A propagation delay on each beamformed signal allows a UE 404 to perform a receive (RX) sweep. The UE 404 in a receive mode may sweep through different receive directions in an attempt to detect a synchronization/discovery signal 406 (see FIG. 4B). One or more of the synchronization/discovery signals 406 may be detected by the UE 404. When a strong synchronization/discovery signal 406 is detected, the UE 404 may determine an optimal transmit direction of the base station 402 and an optimal receive direction of the UE 404 corresponding to the strong synchronization/discovery signal. For example, the UE 404 may determine preliminary antenna weights/directions of the strong synchronization/discovery signal 406, and may further determine a time and/or resource where the base station 402 is expected to optimally receive a beamformed signal. Thereafter, the UE 404 may attempt to associate with the base station 402 via a beamformed signal.

The base station 402 may sweep through a plurality of directions using a plurality of ports in a cell-specific manner in a first symbol of a synchronization subframe. For example, the base station 402 may sweep through different transmit directions (e.g., directions A, B, C, and D) using four ports in a cell-specific manner in a first symbol of a synchronization subframe. In an aspect, these different transmit directions (e.g., directions A, B, C, and D) may be considered "coarse" beam directions. In an aspect, a beam reference signal (BRS) may be transmitted in different transmit directions (e.g., directions A, B, C, and D).

In an aspect, the base station 402 may sweep the four different transmit directions (e.g., directions A, B, C, and D) in a cell-specific manner using four ports in a second symbol of a synchronization subframe. A synchronization beam may occur in a second symbol of the synchronization subframe.

Referring to diagram 420 of FIG. 4B, the UE 404 may listen for beamformed discovery signals in different receive directions (e.g., directions E, F, G, and H). In an example, the UE 404 may sweep through the receive directions according to a sequence E-F-G-H. In another example, the UE 404 may sweep through the receive directions according to the sequence F-H-E-J. Although only four receive directions and two receive sequences are described with respect to FIG. 4B, any number of different receive directions and receive sequences are contemplated.

The UE 404 may attempt the association by transmitting beamformed signals 426 (e.g., association signals or another indication of a best "coarse" beam or a best "fine" beam) in the different transmit directions (e.g., directions E, F, G, and H). In an aspect, the UE 404 may transmit an association signal 426 by transmitting along the optimal receive direction of the UE 404 at the time/resource where the base station 402 is expected to optimally receive the association signal. The base station 402 in the receive mode may sweep through different receive directions and detect the association signal 426 from the UE 404 during one or more timeslots corresponding to a receive direction. When a strong association signal 426 is detected, the base station 402 may determine an optimal transmit direction of the UE 404 and an optimal receive direction of the base station 402 corresponding to the strong association signal. For example, the base station 402 may determine preliminary antenna weights/directions of the strong association signal 426, and may further determine a time and/or resource where the UE 404 is expected to optimally receive a beamformed signal. Any of the processes discussed above with respect to FIGS. 4A and 4B may be refined or repeated over time such that the UE 404 and base station 402 eventually learn the most optimal transmit and receive directions for establishing a link with each other. Such refinement and repetition may be referred to as beam training.

In an aspect, the base station 402 may choose a sequence or pattern for transmitting the synchronization/discovery signals according to a number of beamforming directions. The base station 402 may then transmit the signals for an amount of time long enough for the UE 404 to sweep through a number of beamforming directions in an attempt to detect a synchronization/discovery signal. For example, a base station beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 404 detects a synchronization/discovery signal from the base station 402, the UE 404 may discover that the strongest synchronization/discovery signal is received when the UE 404 beamforming direction is k=2 and the base station 402 beamforming direction is n=3. Accordingly, the UE 404 may use the same antenna weights/directions for responding (transmitting a beamformed signal) to the base station 402 in a corresponding response timeslot. That is, the UE 404 may send a signal to the base station 402 using UE 404 beamforming direction k=2 during a timeslot when the base station 402 is expected to perform a receive sweep at base station 402 beamforming direction n=3.

Path loss may be relatively high in millimeter wave (mmW) systems. Transmission may be directional to mitigate path loss. A base station may transmit one or more beam reference signals by sweeping in all directions so that a user equipment (UE) may identify a best "coarse" beam. Further, the base station may transmit a beam refinement request signal so that the UE may track "fine" beams. If a "coarse" beam identified by the UE changes, the UE may need to inform the base station so that the base station may train one or more new "fine" beams for the UE.

In various aspects, the UE may send an index of a best beam and corresponding beam refinement reference signal session request to the base station in a subframe reserved for RACH. The UE may occupy one or more tones reserved for RACH. Further, the UE may occupy tones that are reserved for scheduling request but not for RACH transmission.

Figures 4C, 4D:
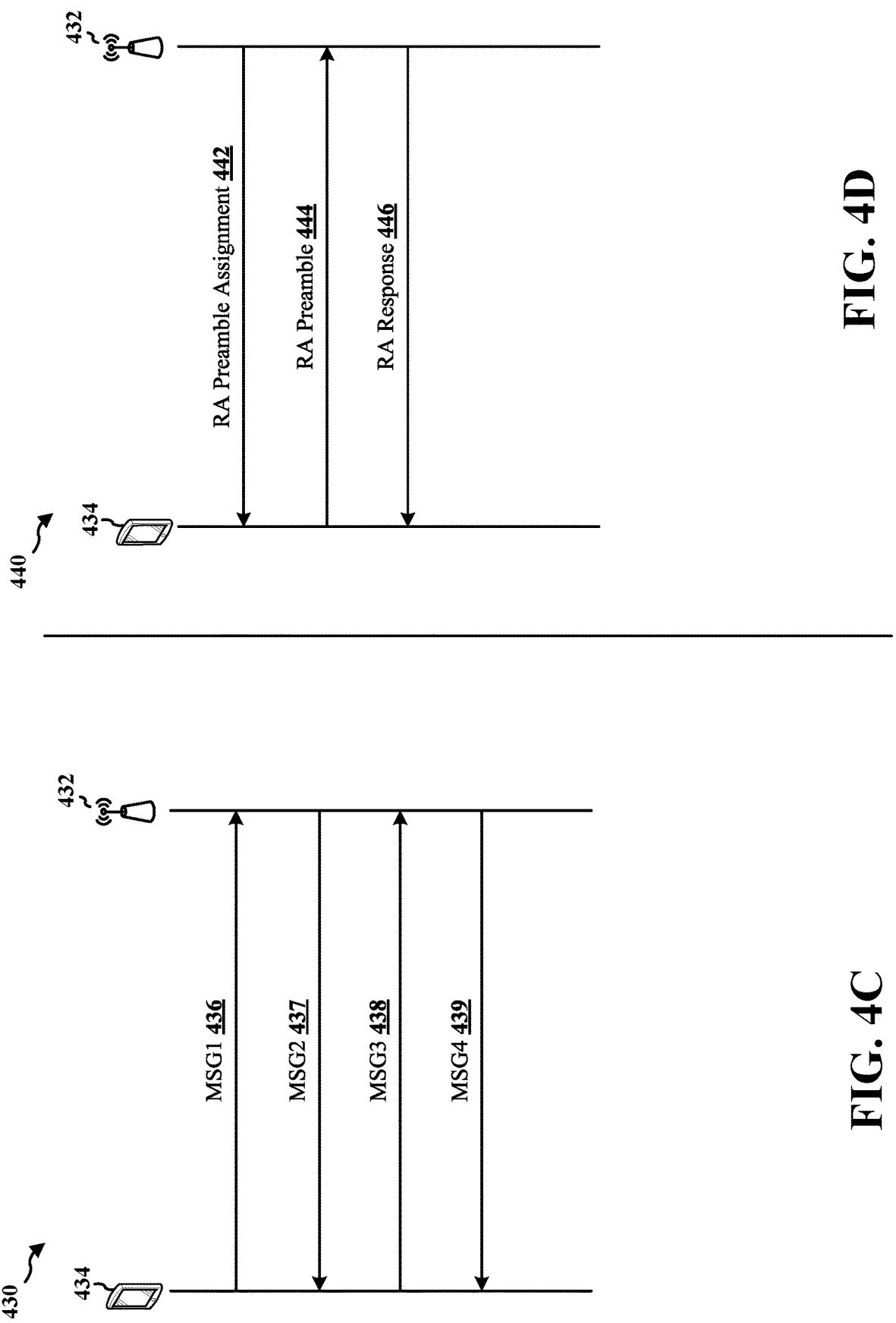
FIGS. 4C and 4D are call flow diagrams illustrating random access channel (RACH) procedures, in accordance with various aspects of the present disclosure.

FIGS. 4C and 4D illustrate call flow diagrams of RACH procedures 430, 440 of RACH procedures. A UE 434 may perform a RACH procedure with a base station 432 (e.g., a mmW base station, an eNB, etc.), for example, in order to synchronize with a network. A RACH procedure may be either contention-based or non-contention based.

FIG. 4C illustrates a contention-based RACH procedure 430. First, the UE 434 may select a RACH preamble for the RACH procedure. Further, the UE 434 may determine a random access (RA) RNTI in order to identify the UE 434 during the RACH procedure. The UE 434 may determine an RA-RNTI based on, for example, a time slot number in which a MSG1 436 is sent. The UE 434 may include the RACH preamble and the RA-RNTI in the MSG1 436.

In an aspect, the UE 434 may determine at least one resource (e.g., a time and/or frequency resource) that is to carry the MSG1 436. For example, the base station 432 may broadcast system information (e.g., a SIB), and the UE 434 may acquire the at least one resource based on the system information (e.g., system information included in a SIB2). The UE 434 may send the MSG1 436 to the base station 432, for example, on the at least one resource. If the UE 434 does not receive a response to the MSG1 436 (e.g., after expiration of a timer), then the UE 434 may increase transmit power (e.g., by a fixed interval) and resend the MSG1 436.

Based on the MSG1 436, the base station 432 may send, to the UE 434, a MSG2 437. The MSG2 437 may also be known as a random access response and may be sent on a downlink shared channel (DL-SCH). The base station 432 may determine a temporary cell RNTI (T-CRNTI). Further, the base station 432 may determine a timing advance value so that the UE 434 may adjust timing to compensate for delay. Further, the base station 432 may determine an uplink resource grant, which may include an initial resource assignment for the UE 434 so that the UE 434 may use the uplink shared channel (UL-SCH). The base station 432 may generate the MSG2 437 to include the C-RNTI, the timing advance value, and/or the uplink grant resource. The base station 432 may then transmit the MSG2 437 to the UE 434. In an aspect, the UE 434 may determine an uplink resource grant based on the MSG2 437.

Based on the MSG2 437, the UE 434 may send, to the base station 432, a MSG3 438. The MSG3 438 may also be known as an RRC connection request message and/or a scheduled transmission message. The UE 434 may determine a temporary mobile subscriber identity (TMSI) associated with the UE 434 or another random value used to identify the UE 434 (e.g., if the UE 434 is connecting to the network for the first time). The UE 434 may determine a connection establishment clause, which may indicate why the UE 434 is connecting to the network. The UE 434 may generate the MSG3 438 to include at least the TMSI or other random value, as well as the connection establishment clause. The UE 434 may then transmit the MSG3 438 to the base station on the UL-SCH.

Based on the MSG3 438, the base station 432 may send, to the UE 434, a MSG4 439. The MSG4 439 may also be known as a connection resolution message. The base station 432 may address the MSG4 439 toward the TMSI or random value from the MSG3 438. The MSG4 439 may be scrambled with a C-RNTI associated with the UE 434. The base station 432 may transmit the MSG4 439 to the UE 434. The UE 434 may decode the MSG4 439, for example, using the C-RNTI associated with the UE 434. This RACH procedure may allow the UE 434 to be synchronized with a network.

FIG. 4D illustrates a non-contention-based RACH procedure 440. The non-contention-based RACH procedure may be applicable to handover and/or downlink data arrival. The base station 432 may determine a random access preamble assigned to the UE 434. The base station 432 may transmit, to the UE 434, the random access preamble assignment 442. The UE 434 may respond to the random access preamble assignment 442 with the random access preamble 444 (e.g., an RRC connection message), which may be the random access preamble assigned to the UE 434. The UE 434 may then receive, from the base station 432, a random access response 446 (e.g., an uplink grant).

With reference to FIGS. 5 through 18, aspects related to signaling repetition of a PDCCH are described herein. In particular, various aspects may describe information (e.g., DCI) carried on a PDCCH that is associated with a MSG2 (or RAR) that is to be carried on a PDSCH. The information carried on the PDCCH that is associated with the MSG2 to be carried on a PDSCH may referred to herein as a "MSG2 PDCCH." The MSG2 PDCCH may be repeated during at least one occasion that a UE is to monitor.

In various aspects, the MSG2 PDCCH is associated with a RACH procedure (e.g., as described with respect to FIGS. 4C-D). In some environments, the MSG2 PDCCH can be common to UEs in a geographic area (e.g., a cell). For example, the search space in which a UE may detect a MSG2 PDCCH may be signaled in a parameter (e.g., "ra-SearchSpace") of an information element (IE) (e.g., PDCCH-ConfigCommon IE).

However, some UEs may have difficulty detecting the MSG2 PDCCH that is common to a geographic area, e.g., when such UEs experience interference and/or are located near a cell edge. Accordingly, the MSG2 PDCCH may be repeated in order to extend coverage and/or increase likelihood of a UE detecting the MSG2 PDCCH in a RACH procedure. Because different UEs may be differently located, the number of repetitions of the PDCCH may be different for different UEs (e.g., UEs near a cell edge may be provided repetitions of the MSG2 PDCCH whereas other UEs may not, cell-edge UEs may be provided different numbers of MSG2 PDCCH repetitions, etc.). Thus, the number of repetitions of a MSG2 PDCCH may be UE-specific for some UEs. Consequently, a common configuration of a MSG2 PDCCH may be insufficient to signal a UE-specific repetition configuration for a MSG2 PDCCH. Therefore, a need exists to signal a UE-specific repetition configuration for a MSG2 PDCCH.

Figure 5:
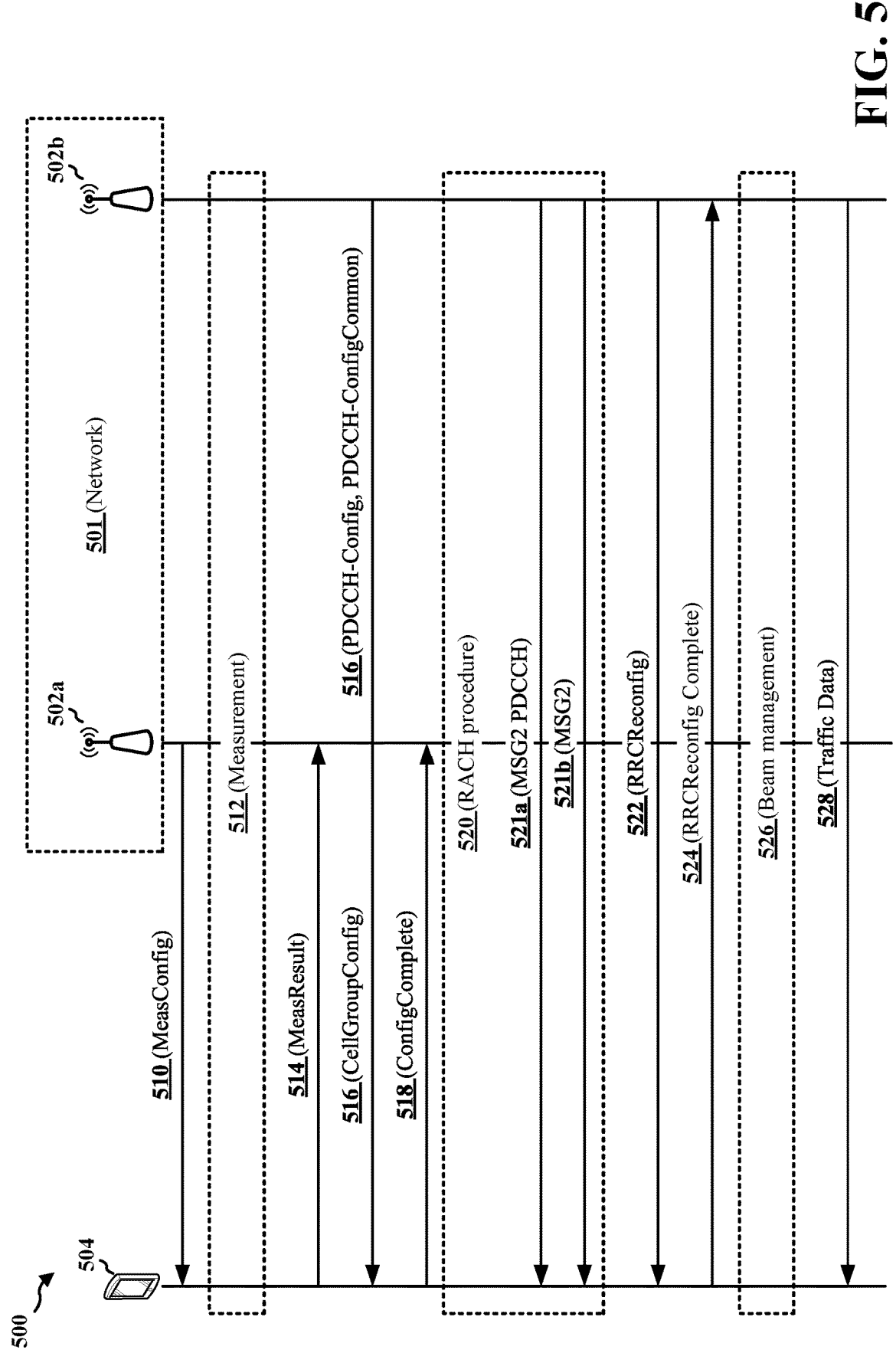
FIG. 5 is a call flow diagram illustrating one or more repetitions of control information on a control channel in a wireless communications system, in accordance with various aspects of the present disclosure.

Referring to FIG. 5, a call flow diagram illustrates operations in a wireless communications environment 500. For example, a UE 504 may communicate with a network 501 that includes one or more base stations 502*a-b*. In some aspects, a first base station 502*a* may be a macro and/or master base station. The first base station 502*a* may be an LTE base station and/or a 5G base station (e.g., mmW base station), which provides a master cell or PCell. The network 501 may further include a second base station 502*b*, which may be a secondary base station and/or small cell base station (e.g., picocell, femtocell, etc.). The second base station 502*b* may be an LTE base station and/or 5G base station (e.g., mmW base station), which provides an SCell.

In some aspects, the first base station 502*a* and the second base station 502*b* may be the same base station. According to a first example of one such aspect, the first base station 502*a* may perform operations described with respect to the second base station 502*b*, and the SCell may be absent such that the UE 504 operates on one cell (e.g., the PCell). According to a second example, the first base station 502*a* may provide a cell that operates with the functionality of both the PCell and the SCell, as described herein.

The first base station 502*a* may configure a RACH procedure between the second base station 502*b* and the UE 504. For example, the first base station 502*a* may configure at least one resource that is dedicated to a RACH preamble (e.g., MSG1) on which the UE 504 is to transmit a RACH preamble for detection by the second base station 502*b*. In some aspects, the first base station 502*a* may configure a set of resources on which a MSG2 (or RAR) is to be transmitted by the second base station 502*b* for detection by the UE 504. The MSG2 may be carried on a PDSCH. However, the schedule for detecting the MSG2 on the PDSCH may be carried on the PDCCH (that is, a MSG2 PDCCH), such as in a DCI message.

In various aspects, the first base station 502*a* may provide measurement configuration information 510 (e.g., MeasConfig) to the UE 504. This measurement configuration information 510 may indicate to the UE 504 that the UE 504 is to perform measurements (e.g., measure signal strength) on secondary cells (e.g., provided by the second base station 502*b*) in order for secondary base stations to be added for the UE 504.

The UE 504 may perform measurement(s) 512 on the secondary cell provided by the second base station 502*b*. For example, the UE 504 may receive one or more reference signals from the second base station 502*b*, such as CSI-RS or another reference signal. In some aspects, each of the one or more reference signals may be respectively received on one or more beams. The UE 504 may measure at least one of a signal-to-noise ratio (SNR), signal-to-interference-plus-noise ratio (SINR), a reference signal received power (RSRP), a reference signal received quality (RSRQ), or another value indicative of channel and/or signal quality or power for at least one of the one or more reference signals in order to obtain the measurement(s) 512. Illustratively, referring to FIG. 4A, the UE 404 may receive at least one of the beamformed signals 406 from the base station 402, and the UE 404 may perform measurement(s) 512 on at least one of the received beamformed signals 406.

The UE 504 may send a report 514 (e.g., MeasResult) indicating the measurement(s) 512 to the first base station 502*a*. Based on the report 514, the first base station 502*a* may determine whether to add the second base station 502*b* for the UE 504 (e.g., for dual connectivity). For example, if one or more measurement(s) 512 satisfies a respective threshold, then the first base station 502*a* may configure the UE 504 to add the second base station 502*b* for dual connectivity.

The first base station 502*a* may configure at least one resource for a RACH preamble (also known as MSG1). In addition, the first base station 502*a* may configure at least one resource for MSG2 in the downlink (e.g., from the second base station 502*b* to the UE 504).

In various aspects, the second base station 502*b* may enable repetition of the MSG2 PDCCH based on the dedicated RACH preamble index (e.g., as configured by the first base station 502*a*). For example, the second base station 502*b* may identify the UE 504 based on the dedicated resource on which the RACH preamble is received from the UE 504. The second base station 502*b* may determine whether the MSG2 PDCCH for the UE 504 is to be repeated, and the second base station 502*b* may determine a number of repetitions of the MSG2 PDCCH for the identified UE 504 (e.g., when the UE 504 is proximate to an edge of a cell, as indicated by one or more measurements performed by the UE 504). For example, the second base station 502*b* may determine the number of repetitions based on a quality measurement, such as an SNR, SINR, or another value indicative of a channel and/or signal quality associated with one or more beams, as measured by the UE 504 during the measurement(s) 512 and sent by the UE 504 in the measurement report 514.

Once the first base station 502*a* configures the UE 504 to add the second base station 502*b*, the UE 504 may perform a RACH procedure 520 (see, e.g., FIGS. 4C-D) with the second base station 502*b*. The RACH procedure 520 may be contention-based or non-contention-based. For example, referring to FIG. 4C, the UE 504 may perform the contention-based RACH procedure 430. Alternatively, referring to FIG. 4D, the UE 504 may perform the non-contention-based RACH procedure 440.

Before or during the RACH procedure 520, the first base station 502*a* may provide configuration information 516 to the UE 504 (e.g., in various fields of various information elements, in various messages, etc.). The configuration information 516 may be included in one or more messages, which may be received from the first base station 502*a* and/or the second base station 502*b*. For example, configuration information 516 may be included in one or more of an RRC message, a MAC CE, or a DCI message. In another example, the configuration information 516 may be included in a SIB (e.g., SIB1). In one example, at least a portion of the configuration information 516 is received in a different frequency band than the MSG2 PDCCH.

In one aspect, the configuration information 516 may include a CellGroupConfig IE, which may include a various fields, including a spCellConfig field that indicates some cell-specific parameters associated with the second base station 502*b*. As indicated in the CellGroupConfig IE (e.g., in the spCellConfig field), the UE 504 may acquire configuration information for the second base station 502*b* to serve the UE 504.

The UE 504 may further receive configuration information 516 from the second base station 502*b*. For example, the UE 504 may acquire PDCCH configuration information associated with a MSG2 from the second base station 502*b*. The PDCCH configuration may be acquired in one or more IEs or fields, which may be UE-specific (e.g., PDCCH-Config) and/or cell-specific (e.g., PDCCH-ConfigCommon). The configuration information 516 may indicate a start (e.g., a start time, such as a symbol or slot, or a start index) and a number of repetitions for a MSG2 PDCCH for one or more monitoring occasions. In some aspects, the configuration information 516 may indicate an aggregation level.

Figure 6:
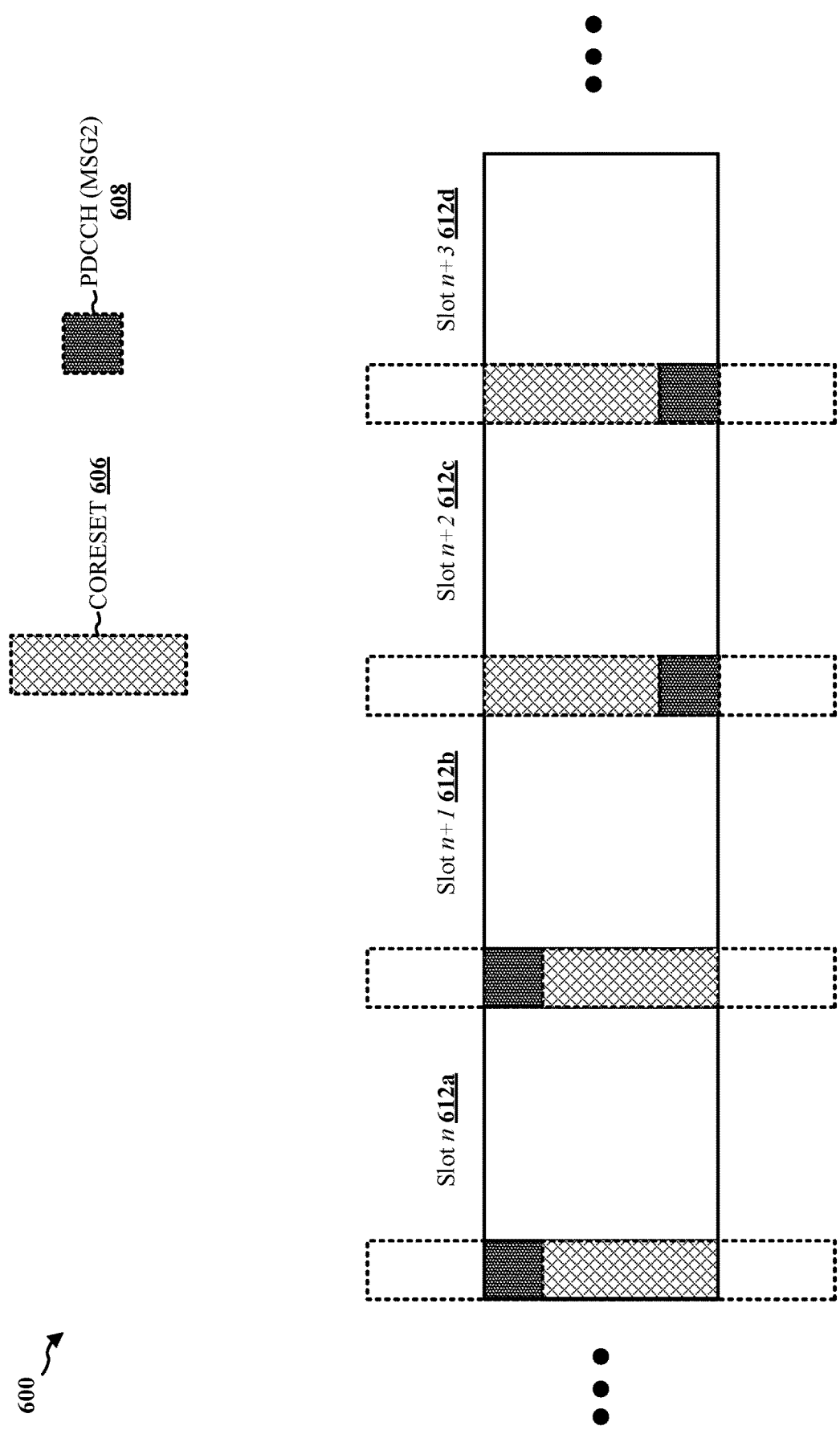
FIG. 6 is a diagram illustrating one or more repetitions of control information on a control channel, in accordance with various aspects of the present disclosure.
Figure 7:
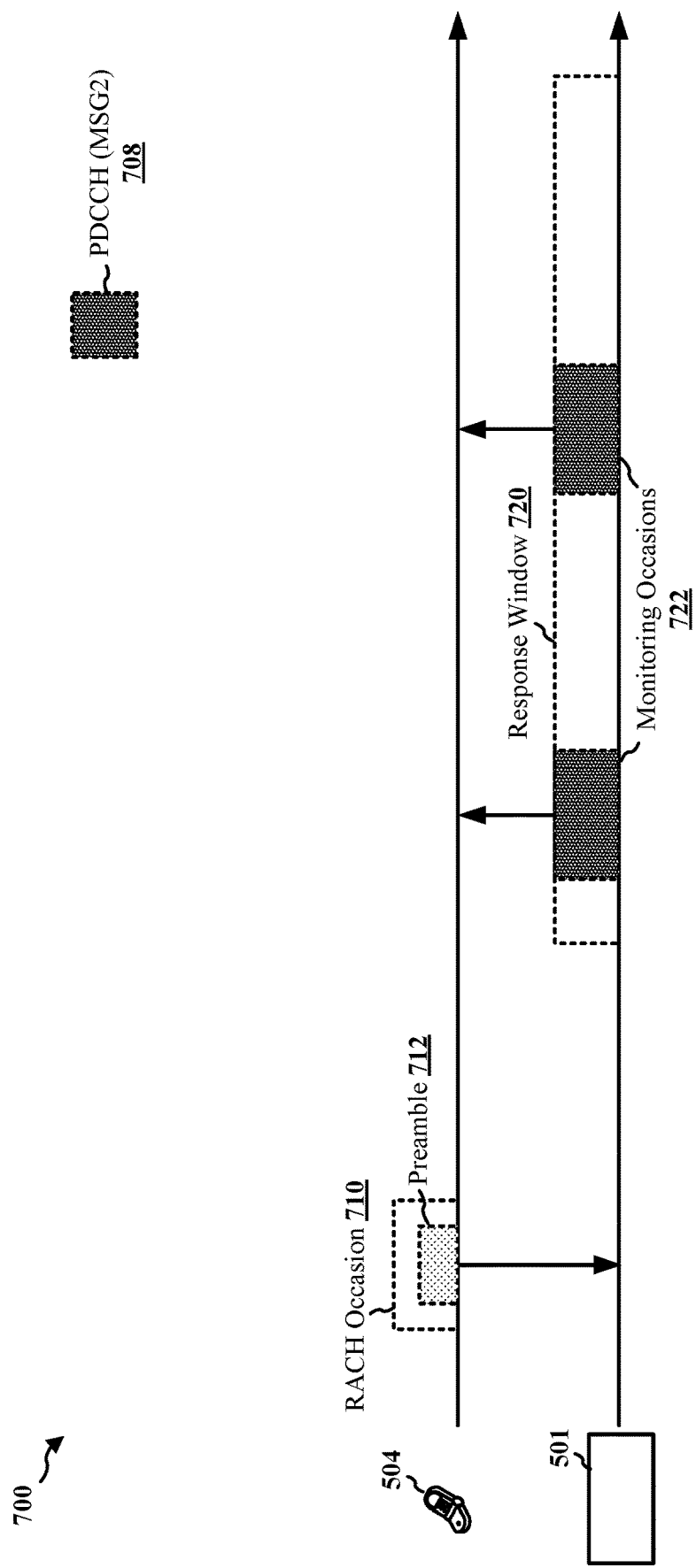
FIG. 7 is a diagram illustrating one or more repetitions of control information on a control channel, in accordance with various aspects of the present disclosure.
Figure 8:
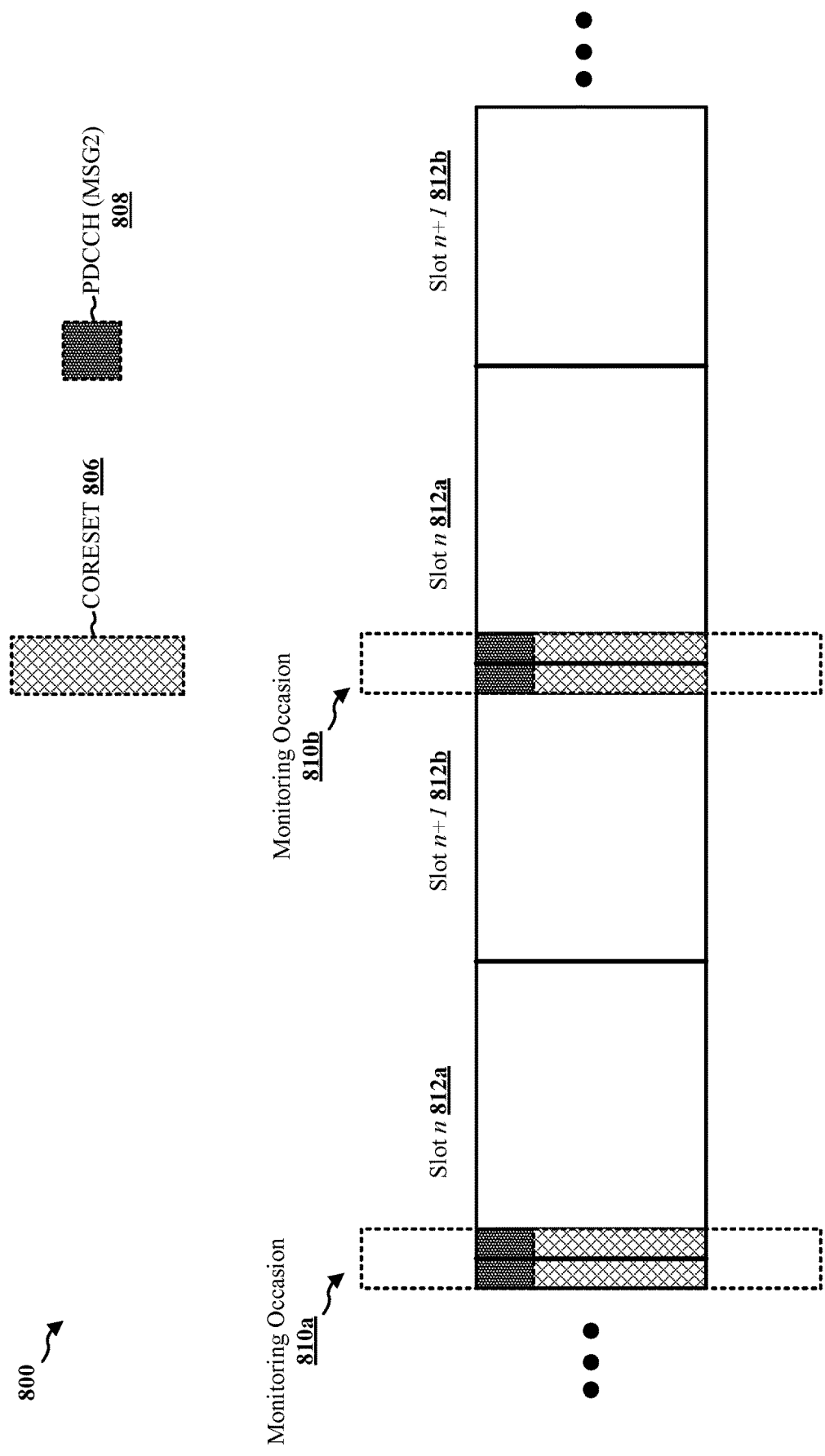
FIG. 8 is a diagram illustrating one or more repetitions of control information on a control channel, in accordance with various aspects of the present disclosure.

As described with respect to FIGS. 6-8, infra, the configuration information 516 may be signaled in a search space configuration that is dedicated or UE-specific (e.g., a search space configuration associated with a MSG2 PDCCH for the UE 504). In one aspect, a UE-specific IE associated with a PDCCH for a UE (e.g., PDCCH-Config) may be configured with an entry (e.g., "dedicated-ra-SearchSpace"). Accordingly, the UE 504 may receive configuration information 516 via UE-specific signaling (e.g., a UE-specific IE) that indicates scheduling information, and the scheduling information may define a number of repetitions and at least one corresponding monitoring occasion.

As described with respect to FIGS. 9-12, infra, the configuration information 516 may be signaled by a common search space configuration (e.g., cell-specific search space configuration), but one or more UE-specific parameters or fields—e.g., one parameter to indicate one or more indices associated with at least one of a set of common monitoring occasions to indicate where the MSG2 PDCCH is carried and one parameter to indicate the number of repetitions of the PDCCH during the at least one of the set of common monitoring occasions.

The UE 504 may send, to the first base station 502a, a message 518 that indicates the configuration information 516 is acknowledged or complete (e.g., ConfigComplete).

The UE 504 may then perform a RACH procedure 520, which may be described with respect to FIGS. 4C-D, supra. For example, the UE 504 may send a RACH preamble (e.g., in a MSG1) on the resource(s) allocated by the first base station 502a to be dedicated for the RACH procedure 520. The second base station 502b may identify the UE 504 based on the dedicated resource(s). In some aspects, the second base station 502b may enable repetition of the MSG2 PDCCH based on the dedicated RACH preamble index.

The second base station 502b may then send, to the UE 504, the one or more repetitions of the MSG2 PDCCH 521a. Each repetition of the MSG2 PDCCH 521a may include a same payload, occur at a same aggregation level, and/or be carried on a same set of frequency resources.

The MSG2 PDCCH 521a may be repeated in one or more monitoring occasions corresponding to the configuration information 516 provided to the UE 504. Monitoring occasions may be configured to have enough resources and to occur at a corresponding start time to accommodate the number of repetitions configured for the MSG2 PDCCH 521a. The monitoring occasions may or may not overlap (e.g., monitoring occasions may not overlap when the MSG2 PDCCH 521a is repeated over adjacent slots).

The UE 504 may receive one or more repetitions of the MSG2 PDCCH 521a and determine a schedule of the MSG2 on the PDSCH based on the MSG2 PDCCH 521a. In some aspects, the UE 504 may combine at least two repetitions of the MSG2 PDCCH 521a in order to determine a complete message (e.g., DCI message) indicating a schedule of the MSG2 521 on the PDSCH. The UE 504 may then receive the MSG2 521b carried on the PDSCH from the second base station 502b by monitoring a set of resources indicated by the MSG2 PDCCH 521a and detecting the MSG2 521b based on monitoring the set of resources. In some aspects, the UE 504 may then respond with a MSG3 based on the MSG2, and the second base station 502b may respond to the MSG3 with a MSG4, e.g., as described with respect to FIG. 4C.

After the RACH procedure 520, the UE 504 may be attached and synchronized with the second base station 502b. In some aspects, the second base station 502b may send an RRC reconfiguration message 522 to the UE 504, e.g., to configure the UE 504, e.g., for measurement reporting. The UE 504 may respond with a message 524 indicating that the RRC reconfiguration is acknowledged or complete.

In some aspects, the UE 504 and the second base station 502b may perform beam management 526. For example, the UE 504 may report measurements indicating beam quality to the second base station 502b (e.g., based on the RRC reconfiguration message 522). The second base station 502b and the UE 504 may select an active beam and/or update a list of candidate beam(s) based on the beam management 526. The second base station 502b may send downlink data 528 to the UE 504 on a beam selected through beam management 526.

With respect to FIGS. 6 through 8, configuration information associated with the MSG2 PDCCH 521a may be signaled in a search space configuration that is dedicated or UE-specific (e.g., a search space configuration associated with a MSG2 PDCCH 521a for the UE 504). For example, the configuration information 516 may include dedicated or UE-specific scheduling information for a MSG2 PDCCH 521a. The configuration information 516 may indicate a number of repetitions and a corresponding monitoring occasion, e.g., via a UE-specific signaling (e.g., in one or more IEs via RRC signaling, a MAC CE, a DCI message, or another message). According to the various aspects described with respect to FIGS. 6 through 8, the MSG2 PDCCH 521a may be implemented as the MSG2 PDDCH 608, MSG2 PDDCH 708, and/or MSG2 PDDCH 808.

In one aspect, a UE-specific IE associated with a PDCCH for a UE (e.g.,

PDCCH-Config) may be configured with a specific and/or predetermined entry (e.g., a "dedicated-ra-SearchSpace" entry). For example, this specific and/or predetermined entry may indicated a configuration of a search space for a random access procedure, such as a UE-specific search space in which a UE may detect a MSG2 PDCCH intended for that UE.

The MSG2 PDCCH 521a may be repeated in adjacent slots (see, e.g., FIGS. 6-7) or adjacent symbols (see, e.g., FIG. 8). With respect to FIG. 6, a schedule 600 of one or more repetitions of a MSG2 PDCCH 608 over adjacent slots is illustrated. The MSG2 PDCCH 608 may occur in a set of resources that is associated with a control resource set (CORESET) 606.

In various aspects, the UE 504 may receive configuration information 516 indicating whether the MSG2 PDCCH is repeated across adjacent slots. For example, in an IE associated with a search space (e.g., SearchSpace IE), such as a search space identifier (ID) entry (e.g., SearchSpaceId) in association with the specific entry (e.g., the "dedicated-ra-SearchSpace" entry), a flag may be used to indicate whether the MSG2 PDCCH 608 is repeated across adjacent or non-adjacent slots. When the flag is set, then the UE 504 may determine that the MSG2 PDCCH 608 is repeated across adjacent or non-adjacent slots of a monitoring occasion.

In some aspects, a flag may be implicit. For example, the configuration of a dedicated search space may implicitly indicate the repetition of the MSG2 PDCCH. When a search space IE (e.g., SearchSpace IE) includes information identifying the search space as dedicated (e.g., a search space ID field may include a specific entry of "dedicated-ra-SearchSpace"), the UE 504 may determine that the MSG2 PDCCH that is repeated across adjacent slots.

When the flag is set, the second base station 502b may transmit the MSG2 PDCCH 608 in each of the adjacent slots 612a-b and/or the adjacent slots 612c-d. For example, the second base station 502*b* may transmit the MSG2 PDCCH 608 in a first monitoring occasion m that includes the adjacent slots 612*a-b*. Similarly, the second base station 502*b* may transmit the MSG2 PDCCH 608 in a second monitoring occasion m+1 that includes the adjacent slots 612*c-d*. In a more general case, the one or more repetitions of the MSG2 PDCCH 608 may be across non-adjacent slots, which may be in the same monitoring occasion.

In each monitoring occasion, the MSG2 PDCCH 608 includes a same payload, occurs in a same PDCCH candidate at a same aggregation level, and is carried on a same set of frequency resources of CORESETs carrying the PDCCHs. However, the MSG2 PDCCH 608 may be different between monitoring occasions. For example, at monitoring occasion m, the MSG2 PDCCH 608 is carried in a same set of frequency resources, which may be different than the frequency resources for the MSG2 PDCCH 608 during monitoring occasion m+1.

In some aspects, the UE 504 may receive configuration information 516 when the search space IE (e.g., SearchSpace IE) includes information identifying the search space as dedicated (e.g., a SearchSpaceId IE may be set to a "dedicated-ra-SearchSpace" entry). For example, the UE 504 may receive the search space IE that indicates a control resource set identity (e.g., a controlResourceSetId IE), and the control resource set identity may indicate the CORESET 606. The control resource set identity may be the same control resource set identity as indicated in a common or cell-specific set of PDCCH parameters (e.g., the same as the "ra-SearchSpace" field included in a PDCCH-ConfigCommon IE).

The UE 504 may receive the search space IE that indicates a monitoring slot periodicity and offset (e.g., monitoring-SlotPeriodicityAndOffset). For example, a field that indicates the monitoring slot periodicity and offset may indicate the starting slot index of a monitoring occasion. For example, FIG. 6 illustrates monitoring occasions m (slots 612*a-b*) and m+1 (slots 612*c-d*), which have a periodicity of two slots and are offset from one another.

The UE 504 may receive the search space IE that indicates a duration (e.g., duration). For example, a field that indicates the duration may indicate the number of consecutive slots per monitoring occasion. For example, FIG. 6 illustrates a monitoring occasion m that includes a duration of two slots 612*a-b*, and a monitoring occasion m+1 that also includes a duration of two slots 612*c-d*.

When the flag is set, monitoring occasions may not overlap. That is, monitoring occasion m may not overlap with monitoring occasion m+1 when the MSG2 PDCCH 608 is repeated across adjacent slots. Otherwise, repetitions of a MSG2 PDCCH from neighboring occasions may be erroneously decoded in a current occasion, causing the UE 504 to incorrectly interpret scheduling information for the MSG2 carried on the PDSCH.

Referring to FIG. 7, schedules 700 associated with a RACH procedure is illustrated, in accordance with various aspects of the present disclosure. According to one of the schedules 700, the UE 504 may transmit the preamble 712 during a RACH occasion 710 so that the preamble 712 is carried on a dedicated resource (e.g., as configured by the first base station 502*a*). After receiving the preamble 712, the second base station 502*b* may identify the UE 504 based on the dedicated resource. The second base station 502*b* may configure another of the schedules 700 in association with one or more repetitions of the MSG2 PDCCH 708 on the PDCCH. The second base station 502*b* may send, to the UE 504, configuration information 516 indicating the schedule associated with the one or more repetitions of the MSG2 PDCCH 708.

The second base station 502*b* may then send one or more repetitions of the MSG2 PDCCH 708 during a response window 720, which may also be known as a time window. According to various aspects, the response window 720 may be a period of time defined for the communication of the MSG2 or RAR, and one or more monitoring occasions may occur during each response window 720.

In some aspects, the second base station 502*b* may send configuration information 516 indicating one or more one or more repetitions of the MSG2 PDCCH 708 during the response window 720. The configuration information 516 may indicate a dedicated search space (e.g., through an entry "dedicated-ra-SearchSpace"). The UE 504 may receive the configuration information 516, and may determine the dedicated search space based on the configuration information 516.

The UE 504 may detect one or more repetitions of the MSG2 PDCCH 708 during a monitoring occasion 722 associated with the dedicated search space (e.g., a search space identity of "dedicated-ra-SeachSpace"). If the UE 504 is unable to decode the entire MSG2 PDCCH 708 from one repetition, the UE 504 may combine information from decoding a plurality of repetitions of the MSG2 PDCCH 708 over one or more monitoring occasions 722. In some aspects, the one or more monitoring occasions 722 may occur during one response window 720. From decoding the MSG2 PDCCH 708, the UE 504 may detect and decode the MSG2 521*b* carried on the PDSCH.

Referring to FIG. 8, a schedule 800 of one or more repetitions of a MSG2 PDCCH 808 over adjacent symbols is illustrated. The MSG2 PDCCH 808 may occur in a set of resources that is associated with a CORESET 806. In a more general case, the PDCCH can be repeated across non-adjacent symbols, which can be in the same slot.

In some aspects, the UE 504 may receive configuration information 516 when the search space IE (e.g., SearchSpace IE) includes information identifying the search space as dedicated (e.g., SearchSpaceId is set to "dedicated-ra-SearchSpace"). For example, the UE 504 may receive the search space IE that indicates a control resource set identity (e.g., controlResourceSetId), and the control resource set identity may indicate the CORESET 806. The control resource set identity may be the same control resource set identity as indicated in a common or cell-specific set of PDCCH parameters (e.g., the same as the "ra-SearchSpace" field included in a PDCCH-ConfigCommon IE).

The UE 504 may receive the search space IE that indicates a monitoring slot periodicity and offset (e.g., monitoring-SlotPeriodicityAndOffset). For example, a field that indicates the monitoring slot periodicity and offset may indicate the starting slot index per monitoring occasion. For example, FIG. 8 illustrates monitoring occasions m 810*a* (e.g., including slots 812*a-b*) and m+1 810*b* (e.g., including slots 812*c-d*), which have a periodicity of two slots.

The UE 504 may receive the search space IE that indicates a number of symbols per monitoring occasion (e.g., monitoringSymbolsWithinSlot). For example, a field that indicates the number of symbols per monitoring occasion 810*a-b* that are to be monitored (e.g., for the CORESET). As shown in FIG. 8, a monitoring occasion m 810*a* that includes two symbols for the CORESET 806 (and the MSG2 PDCCH 808), and a monitoring occasion m+1 810*b* that also includes two symbols for the CORESET 806 (and the MSG2 PDCCH 808).

In aspects, the UE 504 may receive configuration information 516 indicating whether the MSG2 PDCCH 808 is repeated across adjacent symbols. For example, in an IE associated with a search space (e.g., SearchSpace IE), such as a search space identifier (e.g., SearchSpaceId) in association with the entry (e.g., "dedicated-ra-SearchSpace"), a rule may be used to indicate whether the MSG2 PDCCH 608 is repeated across adjacent symbols. Based on the rule, the UE 504 may determine that the MSG2 PDCCH 808 is repeated.

In some aspects, the rule may be implicit. For example, the configuration of a dedicated search space may implicitly indicate the repetition of the MSG2 PDCCH 808. According to one aspect, the UE 504 may receive configuration information 516 that indicates whether the MSG2 PDCCH 808 is repeated across adjacent symbols, and the UE 504 may determine whether the MSG2 PDCCH 808 is repeated across adjacent symbols based on the configuration information 516.

In various aspects, the UE 504 may determine whether the MSG2 PDCCH 808 is repeated across adjacent symbols by applying the rule to the received configuration information 516. By way of example, the rule may be defined such that if the number of symbols per monitoring occasion is X times the number of symbols in the CORESET 806, then the CORESET 806 and the MSG2 PDCCH 808 may be repeated in adjacent symbols for Xtimes.

In other words, the UE 504 may determine that the MSG2 PDCCH 808 will be repeated when the configuration information 516 indicates a number of symbols per monitoring occasion that is a multiple of the number of symbols per CORESET 806 during which the MSG2 PDCCH 808 occurs. Thus, when the UE 504 determines that the MSG2 PDCCH 808 includes a number of symbols (e.g., indicated in monitoringSymbolsWithinSlot) that is a multiple of the number of symbols of the CORESET 806, then the UE 504 may determine that the MSG2 PDCCH 808 is repeated over adjacent symbols during the CORESET 806 of each monitoring occasion.

In the context of FIG. 8, the UE 504 may receive configuration information 516 that indicates the number of symbols per monitoring occasion 810*a-b* is two, which may be a multiple of the number of symbols per CORESET 806 (e.g., the number of symbols per CORESET 806 may be one). The UE 504 may apply the rule in order to determine that two (i.e., the number of symbols per monitoring occasion 810*a-b*) is a multiple of one (i.e., the number of symbols per CORESET 806). Based on the application of the rule, the UE 504 may determine that the MSG2 PDCCH 808 (and the CORESET 806 in which the MSG2 PDCCH 808 occurs) will be repeated across adjacent symbols. The UE 504 may determine that the MSG2 PDCCH 808 will be repeated across two adjacent symbols of each monitoring occasion 810*a-b*.

The UE 504 may monitor adjacent symbols during each monitoring occasion 810*a-b* when the UE 504 determines the MSG2 PDCCH 808 will be repeated in two symbols of each monitoring occasion 810*a-b*. Thus, the UE 504 may monitor two adjacent symbols during the first monitoring occasion 810*a-b*. By way of example, the UE 504 may monitor the first two symbols of the first slot n 812*a* during a time window in which the second base station 502*b* is allotted to transmit the MSG2 PDCCH 808. Accordingly, the UE 504 may detect the MSG2 PDCCH 808 in the first two symbols of the first slot 812*a*, and the UE 504 may detect the MSG2 PDCCH 808 in the first two symbols of the third slot n 812*c* (e.g., the first slot of the monitoring occasion m+1 812*b*).

During the RACH procedure 520, the UE 504 may transmit a preamble on a dedicated resource configured for a RACH occasion (e.g., as configured by the first base station 502*a*). After receiving the preamble, the second base station 502*b* may identify the UE 504 based on the dedicated resource. The second base station 502*b* may then send the repetitions of the MSG2 PDCCH 808 on adjacent symbols of each monitoring occasion 810*a-b* during a time window (e.g., a time window may be defined as a period of time for communication of the MSG2 or RAR in at least one monitoring occasion).

The UE 504 may detect one or more repetitions of the MSG2 PDCCH 808 during one or more of the monitoring occasions 810*a-b* associated with the dedicated search space (e.g., search space identity of "dedicated-ra-SeachSpace"). If the UE 504 is unable to decode the entire MSG2 PDCCH 808 from one repetition, the UE 504 may combine information from decoding attempts of a plurality of repetitions of the MSG2 PDCCH 808 over adjacent symbols in one or more monitoring occasions 810*a-b*. From decoding the MSG2 PDCCH 808, the UE 504 may then detect and decode the MSG2 carried on the PDSCH.

In various aspects, each repetition of the MSG2 PDCCH 808 may include a same payload, occur in a same PDCCH candidate at a same aggregation level, and be carried on a same set of frequency resources of CORESETs carrying the PDCCHs. In various aspects, each monitoring occasion 810*a-b* during which the MSG2 PDCCH 808 occurs may or may not overlap with another monitoring occasion. That is, monitoring occasion m+1 810*b* may or may not overlap with another monitoring occasion during which a different MSG2 PDCCH occurs.

With respect to FIGS. 9 through 12, configuration information associated with the MSG2 PDCCH 521*a* may be signaled by reusing a common configuration associated with MSG2 PDCCH 521*a*, although with additional parameters that are dedicated or UE-specific. For example, the UE 504 may receive configuration information 516 that indicates a common search space associated with random access (e.g., a cell-specific search space associated with the random access procedure 520). In one aspect, a portion of the configuration information 516 may be indicated in one or more IEs (e.g., PDCCH-ConfigCommon IE that includes an ra-SearchSpace field). Further, a portion of the configuration information 516 may be received via broadcast (e.g., an information block, such as a SIB1 or other information block).

When the UE 504 receives the configuration information 516, the UE 504 may follow common monitoring occasions for the MSG2 PDCCH, as indicated in a common field (e.g., ra-SearchSpace field) of a common IE (e.g., PDCCH-ConfigCommon IE). However, an additional portion of the configuration information 516 may further include one or more UE-specific parameters. The one or more UE-specific parameters may be signaled in at least one UE-specific IE. Thus, the configuration information 516 may include at least one common IE and at least one UE-specific IE.

In one aspect, the configuration information 516 may include at least one UE-specific IE having a plurality (e.g., two) UE-specific parameters. In one aspect, a UE-specific IE associated with a PDCCH for a UE (e.g., PDCCH-Config) may be configured with the one or more UE-specific parameters. By way of example, the UE-specific IE (e.g., PDCCH-Config) may include the first UE-specific parameter as a first field labeled "ra-PDCCH-Rep-Occa-Period," and the second UE-specific parameter as a second field labeled "ra-PDCCH-RepNr" (n.b., the labels of the first and second fields are illustrative, and different fields and/or labels are comprehend by the present disclosure).

The first UE-specific parameter may specify the indices of common monitoring occasions during which the UE 504 may expect repetitions of the MSG2 PDCCH (e.g., monitoring occasion indices may be 0, 4, 8, 12, etc.). In one aspect, an index of a monitoring occasion may be selected when the index of the monitoring occasion modulo the value of the first parameter is equal to zero. For example, the indices of monitoring occasions that are equal to 0, 4, 8, 12, etc. may be selected when the first parameter indicates a value of 4 (e.g., (0) % (4)=0, (4) % (4)=0, (8) % (4)=0, etc.). The selected monitoring occasion indices may have sufficient separation in time to accommodate the repetitions of the MSG2 PDCCH within each selected monitoring occasion in order to prevent repetitions of the MSG2 PDCCH from overlapping across neighboring monitoring occasions.

The second UE-specific parameter may specify the number of repetitions of the MSG2 PDCCH that the UE 504 may expect. The second parameter may be based on the measurement report 514 (e.g., MeasResults). For example, the second base station 502b may determine the number of repetitions based on a quality measurement (e.g., signal-to-noise ratio, signal-to-interference-plus-noise ratio, etc.) for one or more beams, as measured by the UE 504 during the measurement(s) 512 and included in the measurement report 514.

Figure 11:
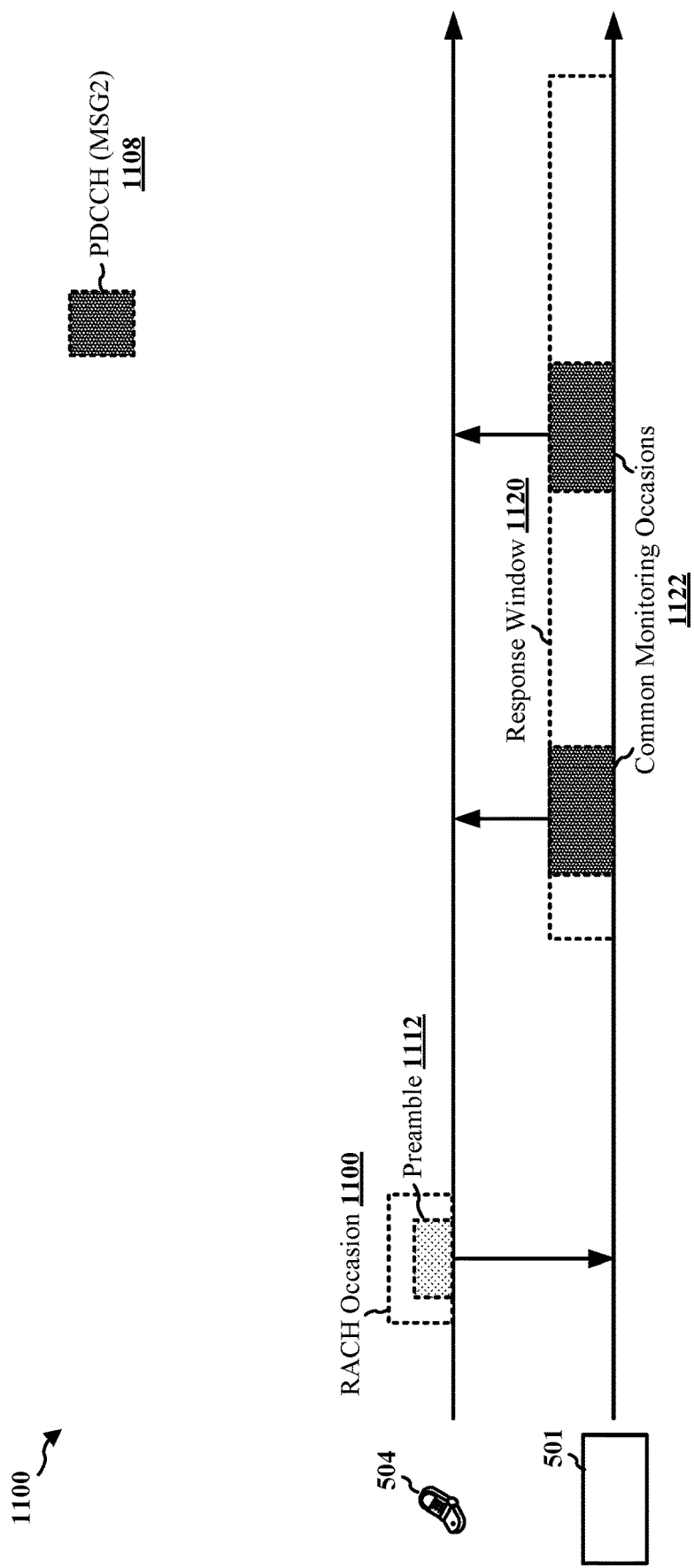
FIG. 11 is a diagram of a portion of a RACH procedure, in accordance with various aspects of the present disclosure.
Figure 12:
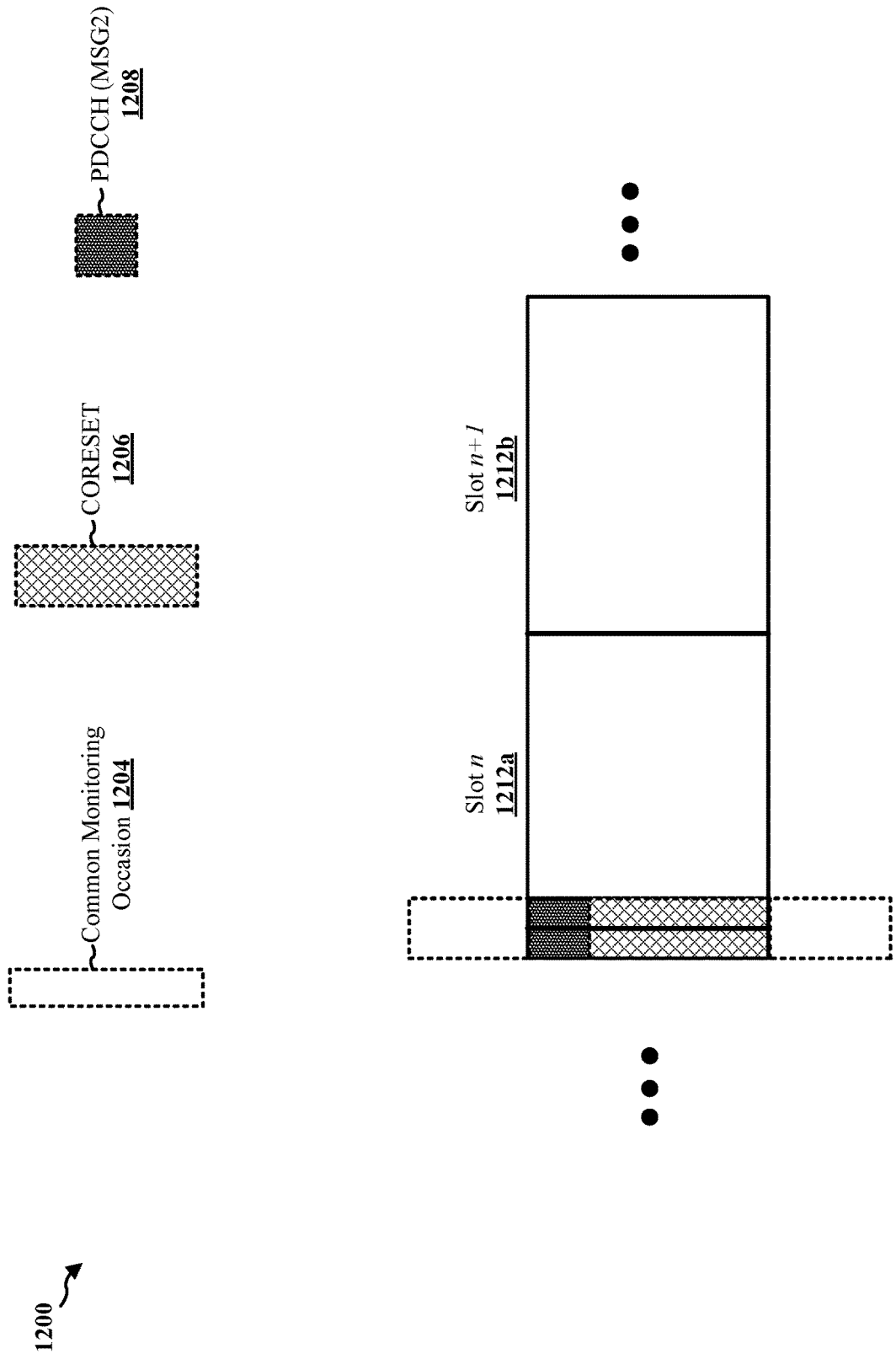
FIG. 12 is a diagram illustrating one or more repetitions of control information on a control channel, in accordance with various aspects of the present disclosure.

The MSG2 PDCCH 521a may be repeated in adjacent slots (see, e.g., FIGS. 10-11) or adjacent symbols (see, e.g., FIG. 12). According to the various aspects described with respect to FIGS. 9 through 12, the MSG2 PDCCH 521a may be implemented as the MSG2 PDDCH 908, MSG2 PDDCH 1008, and/or MSG2 PDDCH 1108.

Figure 9:
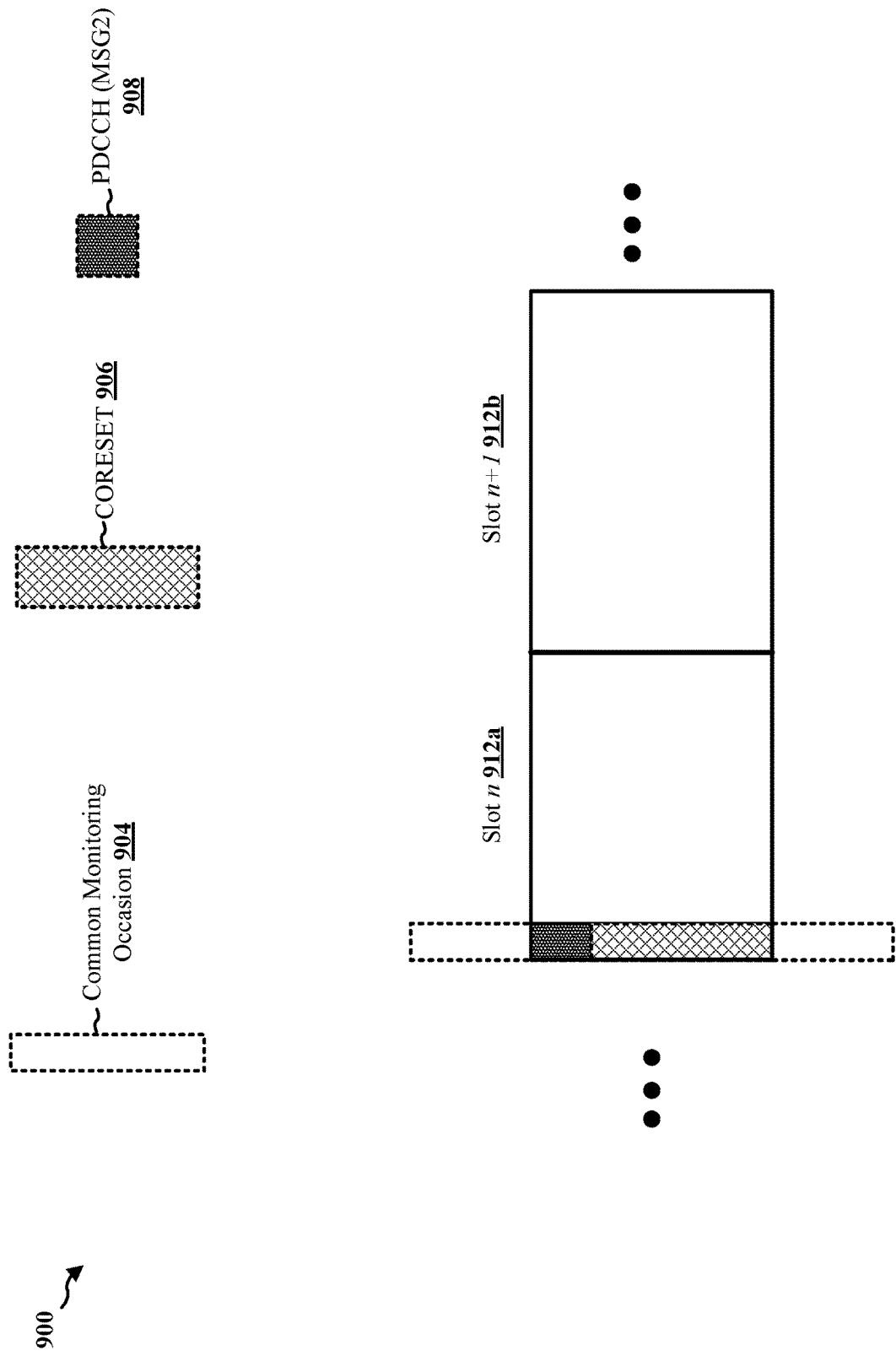
FIG. 9 is a diagram illustrating a configuration of control information on a control channel, in accordance with various aspects of the present disclosure.

With respect to FIG. 9, a schedule 900 of a common configuration associated with a MSG2 PDCCH 908 is illustrated. The MSG2 PDCCH 908 may occur in a CORESET 906 scheduled in a common monitoring occasion 904 for a search space configured for random access included in a slot n 912a of the slots 912a-b. The UE 504 may receive at least one IE (e.g., PDCCH-ConfigCommon) that indicates cell-specific PDCCH parameters provided in a SIB, e.g., during handover, and/or during addition of the second base station 502b by the first base station 502a to serve the UE 504. The UE 504 may receive random access CORESET information indicating the CORESET 906 that is configured for the random access procedure 520 (e.g., ra-CORESET field or ra-ControlResourceSet field may indicate the CORESET 906 configured for random access). Additionally, the UE 504 may receive random access search space information indicating the identity of the search space for the random access procedure 520 (e.g., ra-SearchSpace field may indicate the identity of the search space for a random access procedure).

Figure 10:
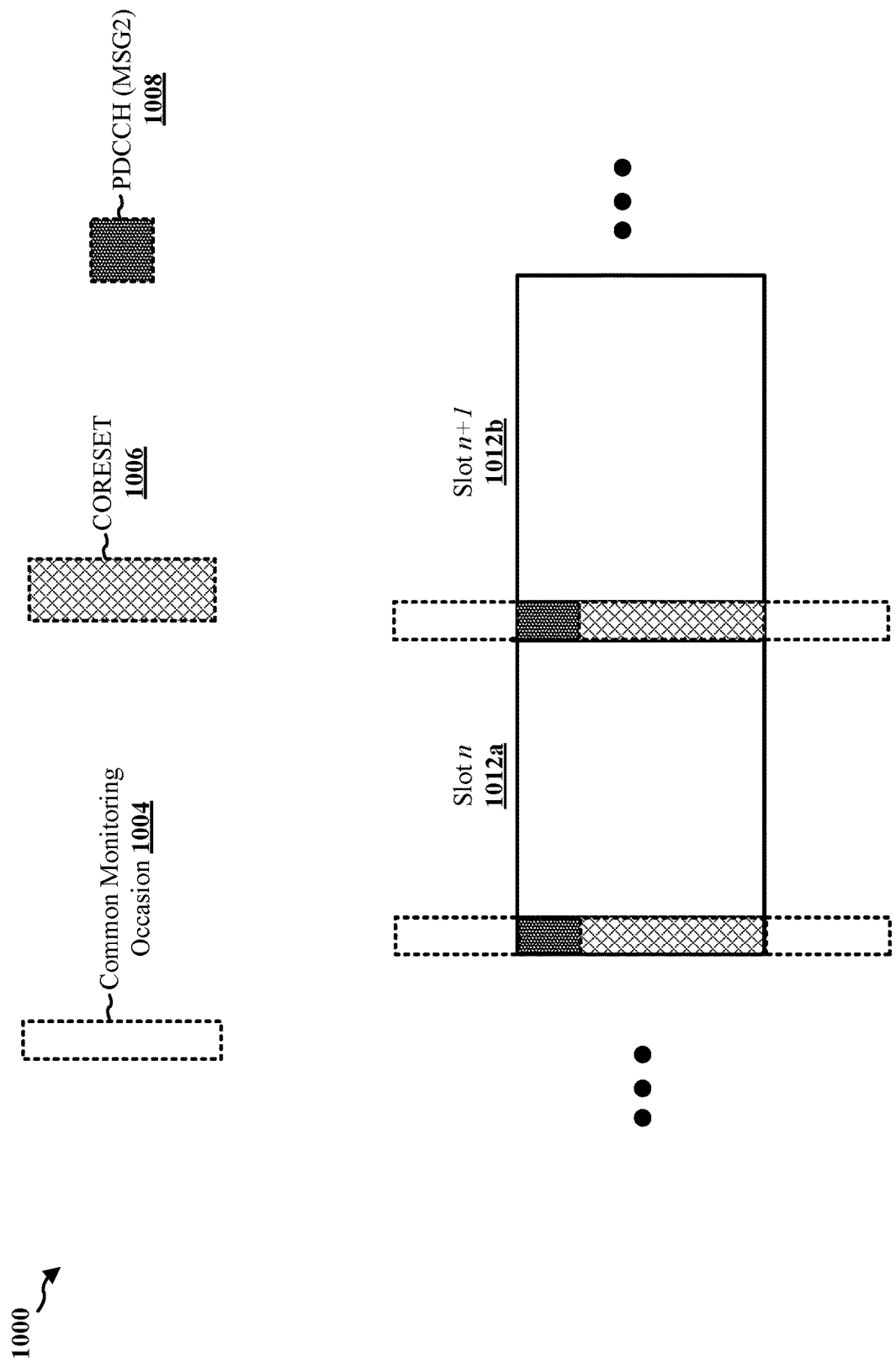
FIG. 10 is a diagram illustrating one or more repetitions of control information on a control channel, in accordance with various aspects of the present disclosure.

Referring to FIG. 10, a schedule 1000 of one or more repetitions of a MSG2 PDCCH 1008 are illustrated. In aspects, each repetition of the MSG2 PDCCH 1008 includes a same payload, occur at a same aggregation level, and is carried on a same set of frequency resource(s). However, the UE 504 may derive the random access CORESET information indicating the CORESET 1006 configured for the random access procedure 520 (e.g., ra-CORESET or ra-ControlResourceSet) based on the second UE-specific parameter (e.g., the second UE-specific parameter may specify the number of repetitions of the MSG2 PDCCH that the UE 504 may expect). Additionally, the UE 504 may derive the identity of the search space for the random access procedure 520 (e.g., ra-SearchSpace) based on the second UE-specific parameter in the following slots (e.g., the second UE-specific parameter may specify the number of repetitions of the MSG2 PDCCH that the UE 504 may expect).

The UE 504 may receive configuration information 516 that indicates the schedule 1000. The schedule 1000 may indicate at least one common monitoring occasion 1004 in which one of the one or more repetitions of the MSG2 PDCCH 1008 may occur. The at least one common monitoring occasion 1004 may be a cell-specific monitoring occasion. In connection with the at least one common monitoring occasion 1004, the UE 504 may determine the schedule 1000 of the at least one common monitoring occasion 1004 based on a common search space configuration. For example, the UE 504 may receive the configuration information 516, and the configuration information may indicate a cell-specific search space configuration. Further to such an example, the UE 504 may receive, in the configuration information 516, at least one IE that indicates cell-specific PDCCH parameters (e.g., PDCCH-ConfigCommon IE).

Accordingly, the UE 504 may determine the schedule 1000 at least in part by determining a set of resources that carry the random access CORESET 1006 during at least one common monitoring occasion 1004. Further, the UE 504 may receive configuration information 516 (e.g., from the second base station 502b) that indicates the one or more UE-specific parameters. According to the example of FIG. 10, a first UE-specific parameter may indicate an index corresponding to a respective first symbol (e.g., symbol 0) of the slots 1012a-b configured for a random access search space associated with the common monitoring occasion 1004. For example, the first UE-specific parameter may indicate one or more indices of one or more common monitoring occasions 1004 during which the UE 504 may expect, and accordingly monitor for, repetitions of the MSG2 PDCCH. Further, a second UE-specific parameter may be equal to two (e.g., the second UE-specific parameter may specify the number of repetitions of the MSG2 PDCCH that the UE 504 may expect). Therefore, the UE 504 may detect the repetitions of the MSG2 PDCCH 1008 on the random access CORESET 1006 in the at least one random access search space associated with at least one common monitoring occasion 1004.

With reference to FIG. 11, schedules 1100 associated with a RACH procedure are illustrated, in accordance with various aspects of the present invention. According to one of the schedules 1100, the UE 504 may transmit the preamble 1112 during a RACH occasion 1110 so that the preamble 1112 is carried on a dedicated resource (e.g., as configured by the first base station 502a). After receiving the preamble 1112, the second base station 502b may identify the UE 504 based on the dedicated resource. According to another of the schedules 1100, the second base station 502b may then send one or more repetitions of the MSG2 PDCCH 1108 during a response window 1120, which may also be known as a time window. For example, the response window 1120 may include a duration during which the MSG2 or RAR may be communicated in at least one of the common monitoring occasions 1122, and the MSG2 PDCCH 1108 may occur during the same or a subsequent response window 1120.

The UE 504 may detect one or more repetitions of the MSG2 PDCCH 1108 during one of the common monitoring occasions 1122 associated with the random access search space. For example, the UE 504 may receive the configuration information 516 from the network 501 (e.g., from the second base station 502b). The UE 504 may derive the identity of the random access search space, e.g., from the configuration information 516. According to various aspects, the identity of the random access search space may be a random access search space that is repeated according to the second UE-specific parameter (e.g., the UE-specific parameter that specifies the number of repetitions of the MSG2 PDCCH 1108 that the UE 504 may expect). For example, a rep-ra-SearchSpace entry may correspond with a ra-SearchSpace entry associated with at least one monitoring occasion, although repeated across adjacent slots according to the second UE-specific parameter.

In addition, the UE 504 may derive the CORESET in which the MSG2 PDCCH 1108 is repeated, which may be the CORESET configured for random access that is repeated according to the second UE-specific parameter (e.g., the UE-specific parameter that specifies the number of repetitions of the MSG2 PDCCH 1108 that the UE 504 may expect). For example, rep-ra-CORESET may correspond to ra-CORESET or ra-ControlResourceSet but repeated across adjacent slots according to the second UE-specific parameter.

If the UE 504 is unable to decode the entire MSG2 PDCCH 1108 from one repetition, the UE 504 may combine information from decoding attempts of a plurality of repetitions of the MSG2 PDCCH 1108 over one or more common monitoring occasions 1122. From decoding the MSG2 PDCCH 1108, the UE 504 may detect and decode the MSG2 carried on the PDSCH.

Referring to FIG. 12, a schedule 1200 of one or more repetitions of the MSG2 PDCCH may occur in adjacent symbols. The MSG2 PDCCH 1208 may occur in a CORESET 1206 scheduled in a monitoring occasion 1204 for a search space configured for random access included in a slot n 1212a. The UE 504 may receive at least one IE (e.g., PDCCH-ConfigCommon) that indicates cell-specific PDCCH parameters, e.g., provided in a SIB, during handover, and/or during addition of the second base station 502b by the first base station 502a to serve the UE 504. The UE 504 may receive random access CORESET information indicating the CORESET 1206 that is configured for the random access procedure 520 (e.g., ra-CORESET field or ra-ControlResourceSet field may indicate the CORESET 1206 configured for random access). Additionally, the UE 504 may receive random access search space information indicating the identity of the search space for the random access procedure 520 (e.g., ra-SearchSpace field may indicate the identity of the search space for a random access procedure).

The repetitions of the MSG2 PDCCH 1208 may include a same payload, occur at a same aggregation level, and carried on a same set of frequency resource(s). However, the UE 504 may derive the random access CORESET information indicating the CORESET 1206 configured for the random access procedure 520 based on the second UE-specific parameter (e.g., the second UE-specific parameter may specify the number of repetitions of the MSG2 PDCCH 1208 that the UE 504 may expect across adjacent symbols of the common random access search space monitoring occasion 1204). For example, a rep-ra-CORESET field may correspond to a ra-CORESET field and/or a ra-ControlResourceSet field, but may be repeated across adjacent symbols according to the second UE-specific parameter.

Additionally, the UE 504 may derive the identity of the search space for the random access procedure 520 (e.g., ra-SearchSpace) based on the second UE-specific parameter (e.g., the second UE-specific parameter may specify the number of repetitions of the MSG2 PDCCH that the UE 504 may expect) in the adjacent symbols. For example, a rep-ra-SearchSpace entry may corresponding with a ra-SearchSpace entry associated with a monitoring occasion, although repeated according to the second UE-specific parameter.

The UE 504 may receive configuration information 516 that indicates a schedule of at least one common monitoring occasion 1204. The at least one common monitoring occasion 1204 may be a cell-specific monitoring occasion. In connection with the at least one common monitoring occasion 1204, the schedule of the at least one common monitoring occasion 1204 may be determined by a common search space configuration (e.g., a cell-specific search space configuration), which the UE 504 may receive in at least one IE that indicates cell-specific PDCCH parameters (e.g., PDCCH-ConfigCommon IE).

Accordingly, the UE 504 may determine a set of resources that carry the random access CORESET 1206 in at least one common monitoring occasion 1204. Further, the UE 504 may receive configuration information 516 (e.g., from the second base station 502b) that indicates the one or more UE-specific parameters. According to the example of FIG. 12, a first UE-specific parameter may indicate an index corresponding to a respective first symbol (e.g., symbol 0) of the slot n 1212a configured for a random access search space associated with the at least one common monitoring occasion 1204. For example, the first UE-specific parameter may indicate the indices of a set of common monitoring occasions 1204 in which the UE 504 may expect, and accordingly monitor for, repetitions of the MSG2 PDCCH 1208 across adjacent symbols. Further, a second UE-specific parameter may indicate a number of one or more repetitions of the MSG2 PDCCH 1208, and the UE 504 may expect, and accordingly monitor for, repetitions of the MSG2 PDCCH 1208 in adjacent symbols of the common monitoring occasion 1204. Therefore, the UE 504 may detect the repetitions of the MSG2 PDCCH 1208 in the random access CORESET 1206 during the at least one random access search space associated with at least one common monitoring occasion 1204.

The UE 504 may detect one or more repetitions of the MSG2 PDCCH 1208 during adjacent symbols in a common monitoring occasion 1204 associated with the random access search space. For example, the UE 504 may derive the identity of the random access search space (e.g., indicated by a ra-SearchSpace entry), which may be the random access search space that is repeated as indicated by the second UE-specific parameter that specifies a number of repetitions of the MSG2 PDCCH 1208 that the UE 504 may expect. For example, a rep-ra-SearchSpace entry may correspond with a ra-SearchSpace entry, although with repetitions indicated by the second UE-specific parameter.

In addition, the UE 504 may derive the CORESET in which the MSG2 PDCCH 1208 is repeated, which may be the CORESET configured for random access that is repeated according to the second UE-specific parameter (e.g., the UE-specific parameter that specifies the number of repetitions of the MSG2 PDCCH 1108 that the UE 504 may expect). For example, rep-ra-CORESET may correspond to ra-CORESET or ra-ControlResourceSet but repeated according to the second UE-specific parameter.

If the UE 504 is unable to decode the entire MSG2 PDCCH 1208 from one repetition, the UE 504 may combine information from decoding a plurality of repetitions of the MSG2 PDCCH 1208 over one or more common monitoring occasions 1204. From decoding the MSG2 PDCCH 1208, the UE 504 may detect and decode the MSG2 carried on the PDSCH.

Figure 13:
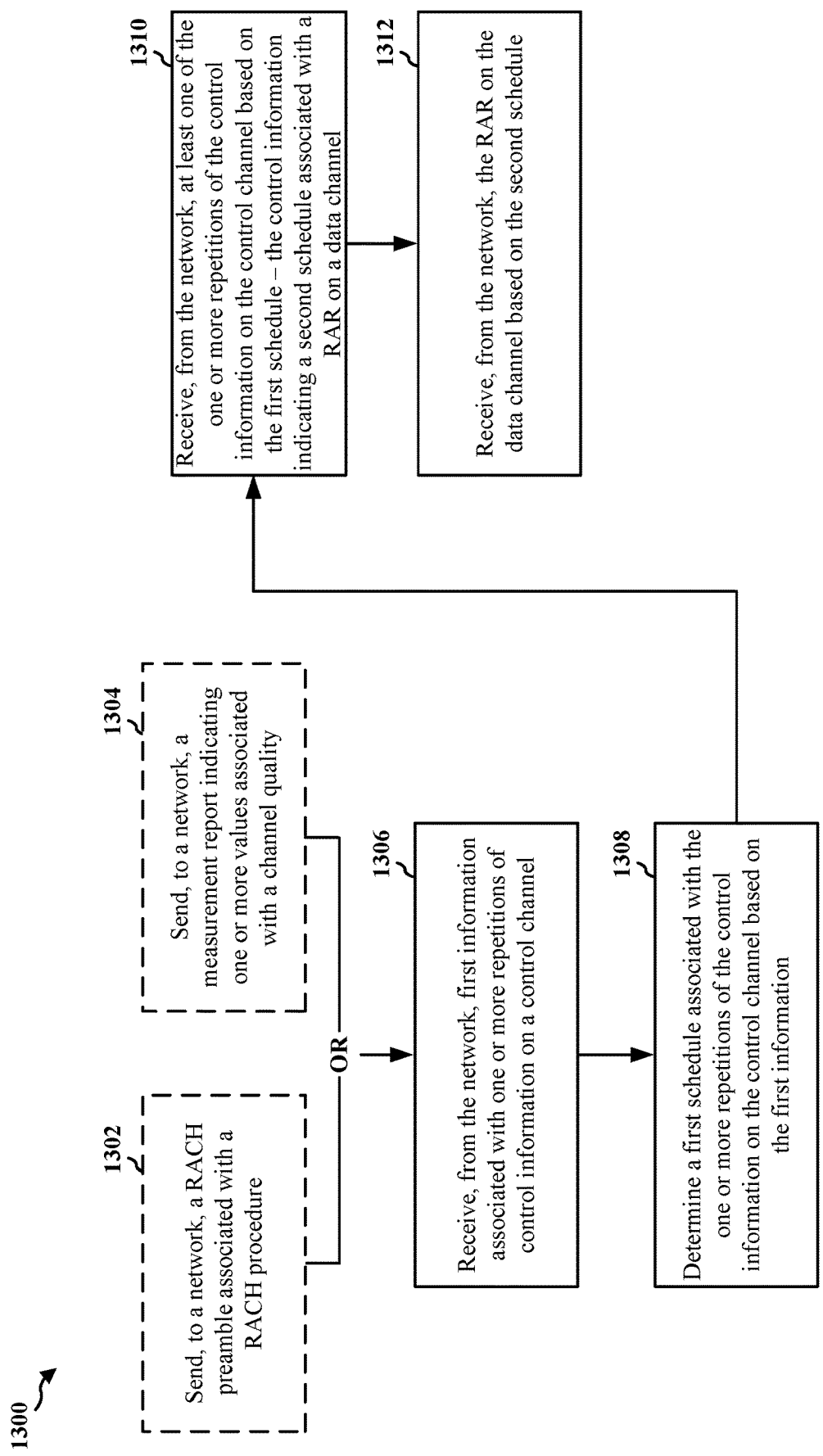
FIG. 13 is a flowchart of a method of wireless communication, in accordance with various aspects of the present disclosure.

Turning to FIG. 13, a flow diagram illustrates a method 1300 of wireless communication, in accordance with various aspects of the present disclosure. According to various aspects, the method 1300 may be performed by a UE or apparatus. According to a first example, the UE performing the method 1300 may be implemented as the UE 104, the UE 350, the UE 404, the UE 434, and/or the UE 504. According to a second example, the apparatus performing the method 1300 may be implemented as an apparatus configured to communicate with the network 501, the apparatus 1402/1402', and/or the processing system 1414, which may include the memory 360 and which may be the entire UE 350 or a component of the UE 350, such as the TX processor 368, the RX processor 356, and/or the controller/processor 359. According to various aspects of the method 1300, one or more operations may be omitted, transposed, and/or contemporaneously performed.

The method 1300 may begin with operation 1302 or operation 1304. For example, a network (e.g., a macro base station, a gNB, a large cell, etc.) may configure one or more repetitions of control information on a control channel for a UE in association with one of a RACH procedure performed with the UE or in association with a measurement report sent by the UE to the network (e.g., to a macro base station, a gNB, a macrocell, PCell, etc. or to a small cell, picocell, femtocell, microcell, SCell, etc.).

When the network is to configure one or more repetitions of control information on a control channel in association with a RACH procedure performed with the UE, the method 1300 may begin with operation 1302. At operation 1302, the UE may send, to the network a, RACH preamble associated with the RACH procedure. For example, the UE may generate the RACH preamble based on one or more parameters received from the network, such as one or more parameters included in at least one SIB or in at least one RRC message. The UE may send the generated RACH preamble to the network.

For example, referring to FIG. 4C, the UE 434 may send, to the base station 432, the MSG1 436, and the MSG1 436 may include a RACH preamble generated by the UE 434. Referring to FIG. 4D, the UE 434 may send, to the base station 432, the RA preamble 444, which may be assigned to the UE 434 by the base station 432 according to the RA preamble assignment 442. Referring to FIG. 5, the UE 504 may generate a RACH preamble and send the RACH preamble to the network 501 in association with the RACH procedure 520. In the context of FIG. 7, the UE 504 may transmit the preamble 712 in the RACH occasion 710. In the context of FIG. 11, the UE 504 may transmit the preamble 1112 in the RACH occasion 1110.

When the network is to configure one or more repetitions of control information on a control channel in association with a measurement report sent by the UE to the network, the method 1300 may begin with operation 1304. At operation 1304, the UE may send, to the network, a measurement report indicating one or more values associated with a channel quality on which the UE communicates with the network. For example, the UE may receive one or more reference signals one on or more beams from the network— e.g., the one or more reference signals may be received from a macro base station (e.g., gNB, macrocell, large cell) or the one or more reference signals may be received from a small cell base station (e.g., microcell, picocell, femtocell, etc.). The UE may measure at least one of a SNR, SINR, RSRP, RSRQ, or another value indicative of channel and/or signal quality or power for at least one of the one or more reference signals. The UE may generate a measurement report that includes at least one of a SNR, SINR, RSRP, RSRQ, or another value indicative of channel and/or signal quality or power for at least one of the one or more reference signals, and the UE may send the measurement report to the network.

For example, referring to FIG. 5, the UE 504 may perform measurement(s) 512 on the secondary cell provided by the second base station 502b. For example, the UE 504 may receive one or more reference signals from the second base station 502b, such as CSI-RS or another reference signal, and the UE 504 may measure at least one of a SNR, SINR, RSRP, RSRQ, or another value indicative of channel and/or signal quality or power for at least one of the one or more reference signals in order to obtain the measurement(s) 512. The UE 504 may send a report 514 (e.g., MeasResult) indicating the measurement(s) 512 to the first base station 502a. Referring to FIG. 4A, the UE 404 may receive at least one of the beamformed signals 406 from the base station 402, and the UE 404 may perform measurement(s) on at least one of the received beamformed signals 406, and the UE 404 may send information indicating the measurement (s) to the base station 402.

At operation 1306, the UE may receive, from the network, first information associated with one or more repetitions of control information on a control channel. In some aspects, the control channel may be implemented as a PDCCH. According to various configurations, the UE may receive the first information via at least one of RRC signaling, a MAC CE, or a DCI message. According to various other configurations, the UE may receive the first information in at least one UE-specific IE that indicates the first information. the UE may receive the first information on a first set of frequency resources, and the first set of frequency resources may be different from a second set of frequency resources on which each of the one or more repetitions of the control information on the control channel is to be received.

The first information be differently configured according to different aspects described herein. In one aspect, the first information may indicate whether the one or more repetitions of the control information on the control channel is greater than one. In another aspect, the first information may indicate that each of the one or more repetitions of the control information on the control channel has at least one of a same payload, a same aggregation level, or a same set of frequency resources. In a third aspect, the first information may include a flag indicated by a search space IE, and at least two of the one or more repetitions of the control information on the control channel are across adjacent slots per monitoring occasion.

In still another aspect, the first information may include a number of symbols associated with the one or more repetitions of the control information on the control channel, and a search space associated with the control channel may include a number of symbols per monitoring occasion that is a multiple of a CORESET carrying the control information on the control channel. In such an aspect, at least two of the one or more repetitions of the control information on the control channel may be across adjacent symbols per monitoring occasion.

In still a further aspect, the first information may indicate a start time and a number of the one or more repetitions of the control information on the control channel for one or more time windows that include each of the one or more repetitions of the control information on the control channel.

In such an aspect, at least two of the one or more repetitions of the control information on the control channel included in the one or more time windows may be across adjacent slots or across adjacent symbols.

In various other aspects, the first information may indicate one or more indices associated with at least one common monitoring occasion that includes the one or more repetitions of the control information on the control channel, and the first information may further indicate a number of the one or more repetitions of the control information on the control channel included in at least one common monitoring occasion. For example, the at least one common monitoring occasion may be associated with a respective schedule that is defined by a common search space configuration. According to one aspect of such an example, the common search space configuration may be indicated in at least one of a SIB or an IE associated with a configuration of common parameters associated with the control channel. In another example, at least two of the one or more repetitions of the control information on the control channel during at least one common monitoring occasion are across one of adjacent symbols or across adjacent slots.

For example, referring to FIG. 5, the UE 504 may receive, from the network 501, the configuration information 516. The UE 504 may receive the configuration information 516 from at least one of the first base station 502a or the second base station 502b. The configuration information 516 may be associated with one or more repetitions of the MSG2 PDCCH 521a on a control channel, such as a PDCCH.

At operation 1308, the UE may determine a first schedule associated with one or more repetitions of the control information on the control channel based on the first information. For example, the UE may identify a set of frequency resources that is to carry the control information on the control channel based on the first information. In addition, the UE may identify a set of time resources on which the UE is to receive the control information on the control channel based on the first information. The UE may determine that the one or more repetitions of the control information on the control channel based on the first information—for example, the control information may be repeated on a set of slots or on a set of symbols. The UE may determine the first schedule to include at least the set of frequency resources, the set of time resources, and the one or more repetitions of the control information on the control channel.

According to one configuration, the UE may determine the first schedule associated with the one or more repetitions of the control information on the control channel based on the first information by determining whether the first information indicates whether the one or more repetitions of the control information on the control channel is greater than one. Further, the UE may determine, based on the first information, that each of the one or more repetitions of the control information on the control channel has at least one of a same payload, a same aggregation level, and/or a same set of frequency resources. The UE may determine that the set of frequency resources on which the control information on the control channel is to be received (according to the first schedule) is different from another set of frequency resources on which the first information is received.

According to another configuration, the UE may determine the first schedule associated with the one or more repetitions of the control information on the control channel based on the first information by identifying a flag indicated by a search space IE. The UE may determine that the identified flag indicates that at least two of the one or more repetitions of the control information on the control channel are across adjacent slots per monitoring occasion.

According to a further configuration, the UE may determine the first schedule associated with the one or more repetitions of the control information on the control channel based on the first information by identifying a number of symbols associated with the one or more repetitions of the control information on the control channel, and by determining a search space associated with the control channel includes a number of symbols per monitoring occasion is a multiple of a CORESET carrying the control information on the control channel. Based on the number of symbols associated with the one or more repetitions of the control information on the control channel, and based on the number of symbols per monitoring occasion that is a multiple of the CORESET associated with the search space for the control channel, the UE may determine that at least two of the one or more repetitions of the control information on the control channel are across adjacent symbols per monitoring occasion.

In still another configuration, the UE may determine the first schedule associated with the one or more repetitions of the control information on the control channel based on the first information by determining a start time and a number of the one or more repetitions of the control information on the control channel for one or more time windows that include each of the one or more repetitions of the control information on the control channel. In one aspect, the UE may determine that at least two of the one or more repetitions of the control information on the control channel included in the one or more time windows are across adjacent slots or adjacent symbols.

In a further configuration, the UE may determine the first schedule associated with the one or more repetitions of the control information on the control channel based on the first information by determining one or more indices associated with at least one common monitoring occasion that includes the one or more repetitions of the control information on the control channel, and by determining a number of the one or more repetitions of the control information on the control channel included in at least one common monitoring occasion. For example, the UE may determine a respective schedule associated with the at least one common monitoring occasion, and the respective schedule may be identified by the UE from a common search space configuration. In another example, the UE may determine that at least two of the one or more repetitions of the control information on the control channel during at least one common monitoring occasion are across adjacent slots or adjacent symbols.

For example, referring to FIG. 5, the UE 504 may determine a first schedule associated with the MSG2 PDCCH 521a of the RACH procedure 520. Referring to FIG. 6, the UE 504 may determine a schedule 600 that includes one or more repetitions of the MSG2 PDCCH 608 over adjacent slots, and the MSG2 PDCCH 608 may occur in a set of resources that is associated with a CORESET 606. Referring to FIG. 7, the UE 504 may determine a set of schedules 700, at least one of which may be associated with one or more repetitions of the MSG2 PDCCH 708 during a monitoring occasion 722 associated with the dedicated search space (e.g., a search space identity indicated by a "dedicated-ra-SeachSpace" entry). Referring to FIG. 8, the UE 504 may determine a first schedule 800 that includes one or more repetitions of a MSG2 PDCCH 808 over adjacent symbols, and the MSG2 PDCCH 808 may occur in a set of resources that is associated with a CORESET 806. Referring to FIG. 9, the UE 504 may determine a schedule 900 of a common configuration associated with a MSG2 PDCCH 908, and one or more repetitions of a MSG2 PDCCH 908 may occur in a CORESET 906 scheduled in at least one common monitoring occasion 904 for a search space configured for random access included in a slot n 912*a* of the slots 912*a-b*. Referring to FIG. 10, the UE 504 may determine a schedule 1000 of one or more repetitions of a MSG2 PDCCH 1008 that are to occur in one or more common monitoring occasions 1004, such as a cell-specific monitoring occasion. Referring to FIG. 11, the UE 504 may determine a least one of the schedules 1100 corresponding to one or more repetitions of the MSG2 PDCCH 1108 received in one or more common monitoring occasions 1122 in the response window 1120. Referring to FIG. 12, the UE 504 may determine a schedule 1200 of one or more repetitions of the MSG2 PDCCH in adjacent symbols, and at least one of the MSG2 PDCCH 1208 may occur in a CORESET 1206 scheduled in a monitoring occasion 1204 for a search space configured for random access included in a slot n 1212*a*.

At operation 1310, the UE may receive, from the network, at least one of the one or more repetitions of the control information on the control channel based on the first schedule. The control information may indicate a second schedule associated with an RAR (also referred to as a MSG2) on a data channel. For example, the data channel may be a PDSCH. The UE may determine one a set of time and frequency resources on which the RAR is to be transmitted by the network based on the control information and, accordingly, the UE may monitor for the RAR on the determined set of time and frequency resources.

For example, referring to FIG. 5, the UE 504 may receive one or more repetitions of the MSG2 PDCCH 521*a* on the PDCCH. From the MSG2 PDCCH 521*a*, the UE 504 may determine a second schedule associated with the MSG2 521*b* to be received on the PDSCH. Referring to FIG. 6, the UE 504 may receive one or more repetitions of the MSG2 PDCCH 608 in at least each of the slots n through n+1 612*a-b*. Referring to FIG. 7, the UE 504 may receive one or more repetitions of the MSG2 PDCCH 708 in the monitoring occasions 722 in the response window 720. Referring to FIG. 8, the UE 504 may receive one or more repetitions of the MSG2 PDCCH 808 in at least one of the monitoring occasions 810*a-b*. Referring to FIG. 9, the UE 504 may receive one or more repetitions of the MSG2 PDCCH 908 in at least one common monitoring occasion 904, which may be carried in the CORESET 906. Referring to FIG. 10, the UE 504 may receive one or more repetitions of the MSG2 PDCCH 1008 in the common monitoring occasions 1004, which may be carried in the CORESET 1006. Referring to FIG. 11, the UE 504 may receive one or more repetitions of the MSG2 PDCCH 1108 in the common monitoring occasions 1122 in the response window 1120. Referring to FIG. 12, the UE 504 may receive one or more repetitions of the MSG2 PDCCH 1208 in at least one common monitoring occasion 1204.

At operation 1312, the UE may receive, from the network, the RAR on the data channel based on the second schedule. For example, the UE may monitor a set of time and frequency resources based on the second schedule, and the UE may receive the RAR on the monitored set of time and frequency resources. The UE may then proceed with the RACH procedure, such as by sending a MSG 3 to the network and receiving a MSG4 from the network based on the MSG 3. In various aspects, the data channel may be a PDSCH.

For example, referring to FIG. 4C, the UE 434 may receive, from the base station 432, the MSG2 437. Referring to FIG. 4D, the UE 434 may receive, from the base station 432, the random access response 446. Referring to FIG. 5, the UE 504 may receive the MSG2 521*b* (also known as the RAR) on the PDSCH from the first base station 502*a* or from the second base station 502*b*.

Figure 14:
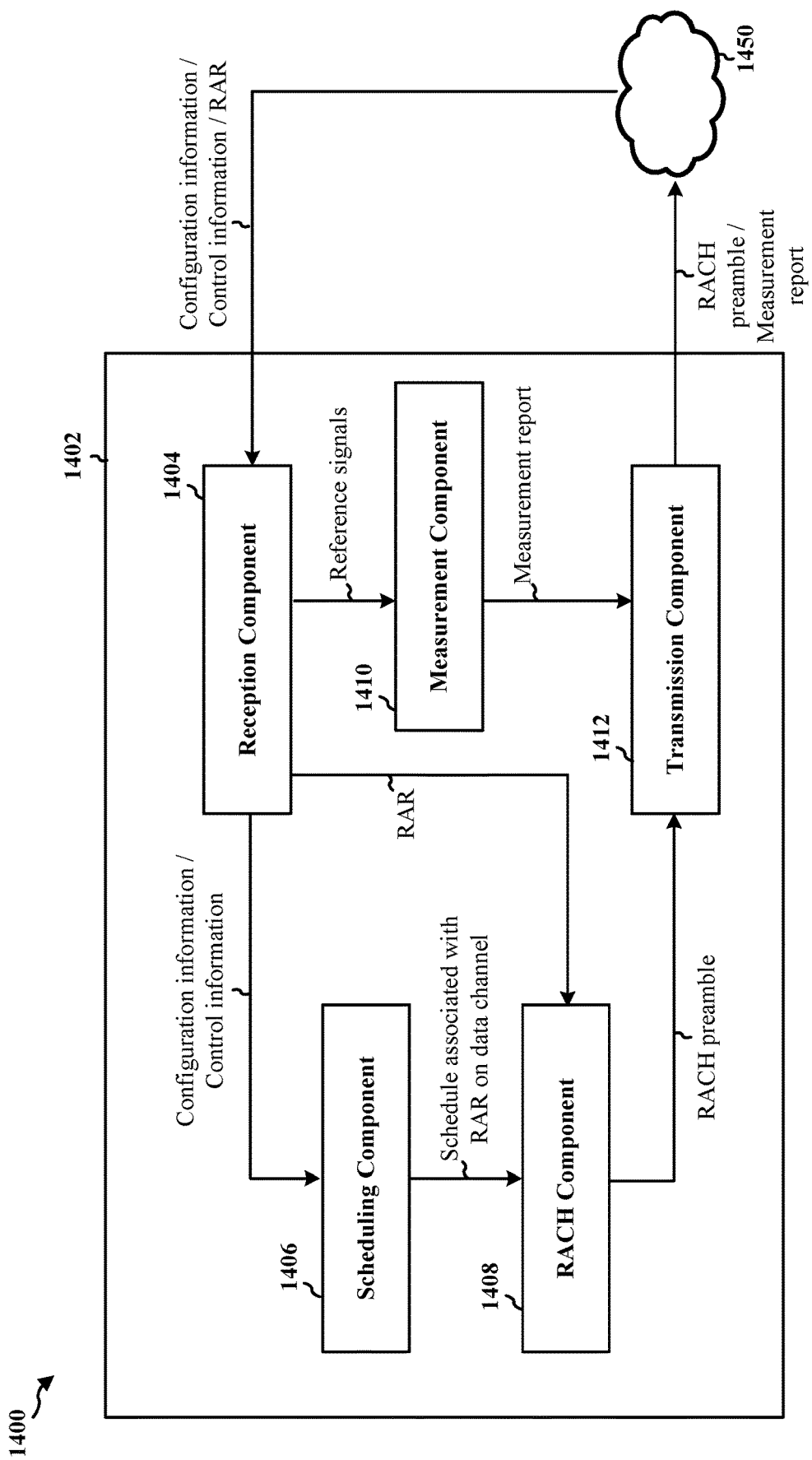
FIG. 14 is a conceptual data flow diagram illustrating the data flow between different means/components in an example apparatus, in accordance with various aspects of the present disclosure.

FIG. 14 is a conceptual data flow diagram 1400 illustrating the data flow between different means/components in an example apparatus 1402. The apparatus 1402 may be a UE. The apparatus 1402 may include a reception component 1404 configured to receive signals from a network 1450, which may include a first base station and/or a second base station. The apparatus 1402 may include a transmission component 1412 configured to transmit signals to the network 1450.

According to some aspects, the apparatus 1402 may include a RACH component 1408. The RACH component 1408 may be configured to generate a RACH preamble. Further, the RACH component 1408 may determine at least one dedicated resource that is to carry the RACH preamble. The RACH component 1408 may provide the RACH preamble to the transmission component 1412. The transmission component 1412 may send the RACH preamble to the network 1450 on the at least one dedicated resource, e.g., as described at operation 1302 of FIG. 13.

According to some other aspects, the reception component 1404 may receive one or more reference signals one on or more beams from the network 1450—e.g., the one or more reference signals may be received from a macro base station (e.g., gNB, macrocell, large cell) or the one or more reference signals may be received from a small cell base station (e.g., microcell, picocell, femtocell, etc.).

A measurement component 1410 may measure at least one of a SNR, SINR, RSRP, RSRQ, or another value indicative of channel and/or signal quality or power for at least one of the one or more reference signals. The measurement component 1410 may generate a measurement report that includes at least one of a SNR, SINR, RSRP, RSRQ, or another value indicative of channel and/or signal quality or power for at least one of the one or more reference signals. The measurement component 1410 may provide the measurement report to the transmission component 1412, and the transmission component 1412 may send the measurement report to the network 1450, e.g., as described at operation 1304 of FIG. 13.

The reception component 1404 may receive, from the network 1450, first information (e.g., configuration information) associated with one or more repetitions of control information on a control channel, e.g., as described at operation 1306 of FIG. 13. For example, the control channel may be a PDCCH. In one aspect, the first information may be received via at least one of RRC signaling, a MAC CE, or a DCI message. In another aspect, the first information may be received on a first set of frequency resources that is different from a second set of frequency resources on which each of the one or more repetitions of the control information on the control channel is received. In a further aspect, the first information may be indicated in at least one UE-specific IE.

The reception component 1404 may provide the first information associated with the one or more repetitions of the control information on the control channel to a scheduling component 1406. The scheduling component 1406 may determine a first schedule associated with the one or more repetitions of the control information on the control channel based on the first information, e.g., as described at operation 1308 of FIG. 13. In one aspect, the first information indicates whether the one or more repetitions of the control information on the control channel is greater than one. In another aspect, the first information may indicate each of the one or more repetitions of the control information on the control channel has at least one of a same payload, a same aggregation level, and/or a same set of frequency resources.

In a further aspect, the first information may include a flag indicated by a search space IE, and at least two of the one or more repetitions of the control information on the control channel may be across adjacent slots. In another further aspect, the first information may include a number of symbols associated with the one or more repetitions of the control information on the control channel, and a search space associated with the control channel may include a number of symbols per monitoring occasion that is a multiple of a CORESET carrying the control information on the control channel, and at least two of the one or more repetitions of the control information on the control channel may be across adjacent symbols per monitoring occasion.

In still another aspect, the first information may indicate a start time and a number of the one or more repetitions of the control information on the control channel for one or more time windows that include each of the one or more repetitions of the control information on the control channel. For example, at least two of the one or more repetitions of the control information on the control channel included in the one or more time windows may be across adjacent slots or adjacent symbols.

In an additional aspect, the first information may indicate one or more indices associated with at least one common monitoring occasion that includes the one or more repetitions of the control information on the control channel, and the first information may further indicate a number of the one or more repetitions of the control information on the control channel included in at least one common monitoring occasion. For example, the at least one common monitoring occasion may be associated with a respective schedule that is defined by a common search space configuration. The common search space configuration may be indicated in at least one of a SIB or an IE associated with a configuration of common parameters associated with the control channel. Further, at least two of the one or more repetitions of the control information on the control channel during the at least one common monitoring occasion may be across one of adjacent slots or adjacent symbols.

The scheduling component 1406 may provide the determined first schedule to the reception component 1404. Based on the first schedule, the reception component 1404 may receive, from the network 1450, at least one of the one or more repetitions of the control information on the control channel, as described at operation 1310 of FIG. 13.

The scheduling component 1406 may obtain the control information from the reception component 1404. The control information may indicate a second schedule associated with a RAR on a data channel. For example, the data channel may be a PDSCH. The scheduling component 1406 may determine the second schedule, and provide the determined second schedule to the reception component 1404.

The reception component 1404 may receive, from the network 1450, the RAR on the data channel based on the second schedule, as described at operation 1312 of FIG. 13. The reception component 1404 may provide the RAR to the RACH component 1408. The RACH component 1408 may continue a RACH procedure with the network 1450 based on the RAR. For example, the RACH component 1408 may generate a connection request message or MSG3, and may cause the transmission component 1412 to transmit the connection request message or MSG3.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
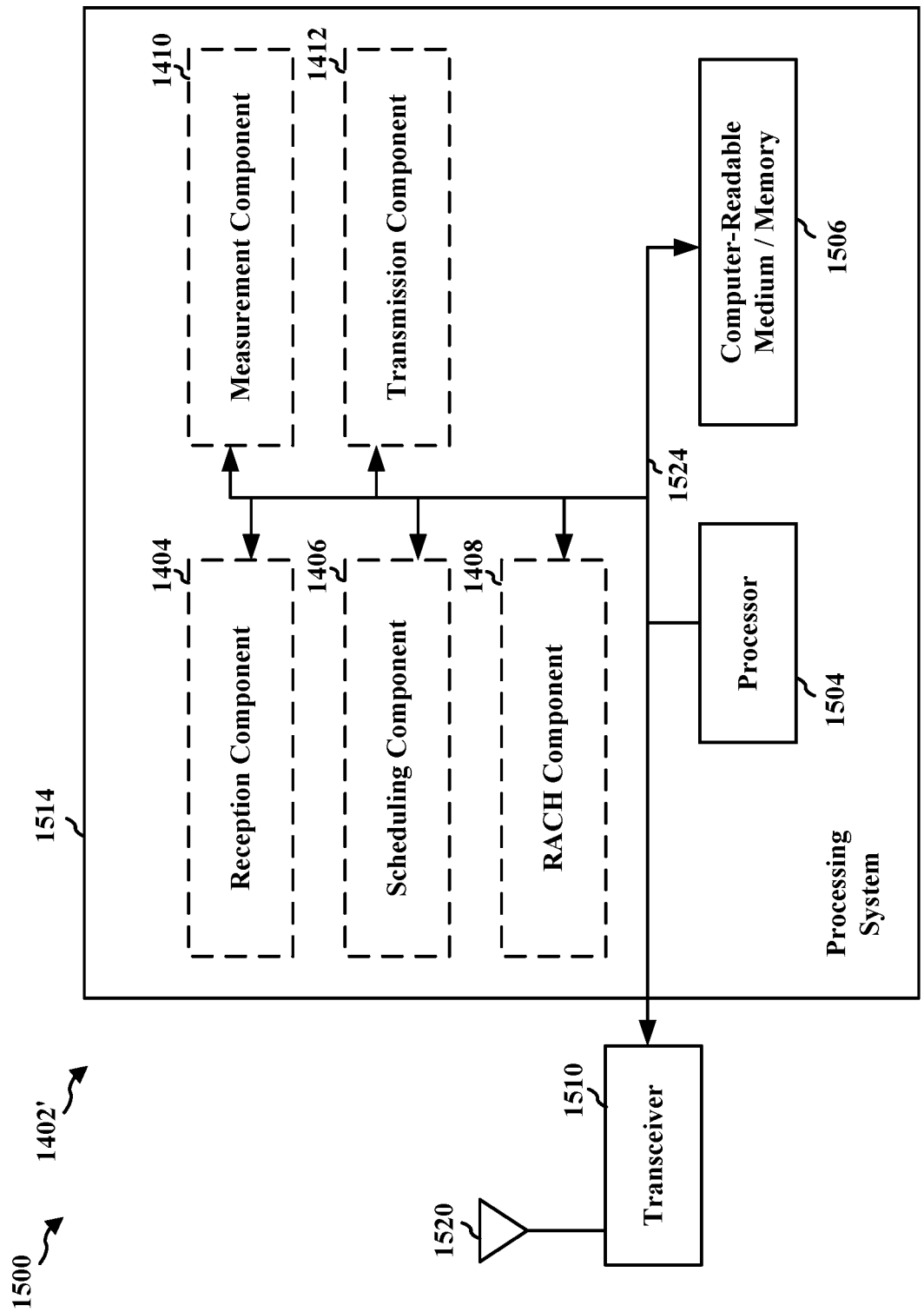
FIG. 15 is a diagram illustrating an example of a hardware implementation for an apparatus employing a processing system, in accordance with various aspects of the present disclosure.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1412, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359. Alternatively, the processing system 1514 may be the entire UE (e.g., see 350 of FIG. 3).

In one configuration, the apparatus 1402/1402' for wireless communication includes means for receiving, from a network, first information associated with one or more repetitions of control information on a control channel. The apparatus 1402/1402' may include means for determining a first schedule associated with the one or more repetitions of the control information on the control channel based on the first information. The apparatus 1402/1402' may include means for receiving, from the network, at least one of the one or more repetitions of the control information on the control channel based on the first schedule, wherein the control information indicates a second schedule associated with a RAR on a data channel. The apparatus 1402/1402' may include means for receiving, from the network, the RAR on the data channel based on the second schedule.

In one aspect, the first information indicates whether the one or more repetitions of the control information on the control channel is greater than one. In another aspect, the first information indicates each of the one or more repetitions of the control information on the control channel has at least one of a same payload, a same aggregation level, or a same set of frequency resources. In a further aspect, the first information comprises a flag indicated by a search space IE, and at least two of the one or more repetitions of the control information on the control channel are across adjacent slots per monitoring occasion. In still another aspect, the first information comprises a number of symbols associated with the one or more repetitions of the control information on the control channel, and wherein a search space associated with the control channel comprises a number of symbols per monitoring occasion that is a multiple of a CORESET carrying the control information on the control channel, and at least two of the one or more repetitions of the control information on the control channel are across adjacent symbols per monitoring occasion.

In one aspect, the first information indicates a start time and a number of the one or more repetitions of the control information on the control channel for one or more time windows that include each of the one or more repetitions of the control information on the control channel. In one aspect, at least two of the one or more repetitions of the control information on the control channel included in the one or more time windows are across adjacent slots or adjacent symbols.

In one aspect, the first information is received via at least one of RRC signaling, a MAC CE, or a DCI message. In another aspect, the first information is received on a first set of frequency resources that is different from a second set of frequency resources on which each of the one or more repetitions of the control information on the control channel is received. In an further aspect, the first information indicates one or more indices associated with at least one common monitoring occasion that includes the one or more repetitions of the control information on the control channel, and the first information further indicates a number of the one or more repetitions of the control information on the control channel included in at least one common monitoring occasion. In yet another aspect, the at least one common monitoring occasion is associated with a respective schedule that is defined by a common search space configuration. In one aspect, the common search space configuration is indicated in at least one of a SIB or an IE associated with a configuration of common parameters associated with the control channel.

In one aspect, the first information is indicated in at least one UE-specific IE. In one aspect, at least two of the one or more repetitions of the control information on the control channel during at least one common monitoring occasion are across one of adjacent slots or adjacent symbols. In one aspect, the control channel comprises a PDCCH, and the data channel comprises a PDSCH.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
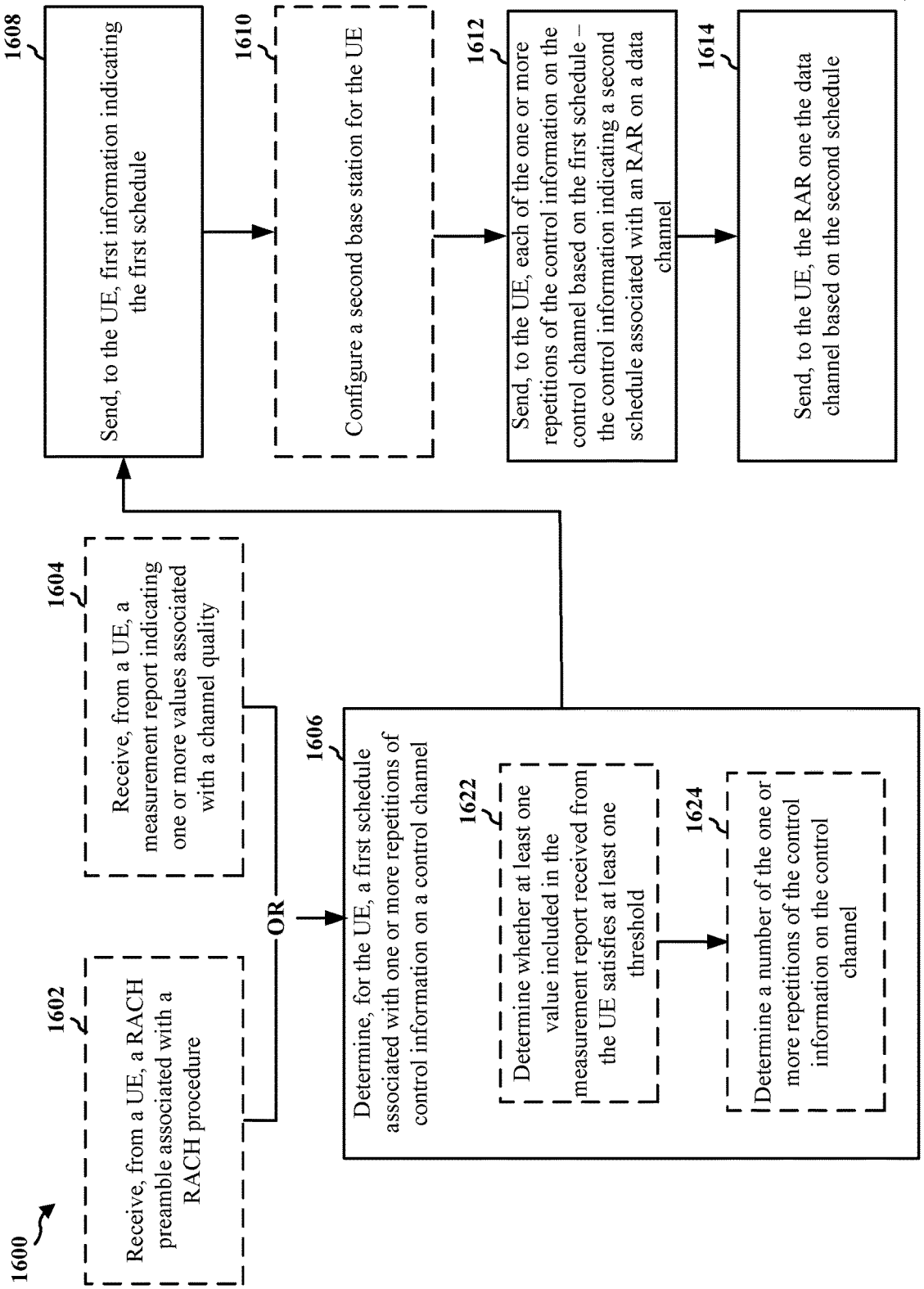
FIG. 16 is a flowchart of a method of wireless communication, in accordance with various aspects of the present disclosure.

Turning to FIG. 16, a flow diagram illustrates a method 1600 of wireless communication, in accordance with various aspects of the present disclosure. The method 1600 may be performed by at least one base station and/or apparatus. According to a first example, the base station performing the method 1600 may be implemented as the base station 102/180, the base station 310, the base station 402, the base station 432, and/or at least one base station 502a, 502b. According to a second example, the apparatus performing the method 1600 may be implemented as an apparatus of the network 501, the apparatus 1702/1702', and/or the processing system 1714, which may include the memory 376 and which may be the entire base station 310 or a component of the base station 310, such as the TX processor 316, the RX processor 370, and/or the controller/processor 375. According to various aspects of the method 1600, one or more operations may be omitted, transposed, and/or contemporaneously performed.

The method 1600 may begin with operation 1602 or operation 1604. For example, a network (e.g., a macro base station, a gNB, a large cell, etc.) may configure one or more repetitions of control information on a control channel for a UE in association with one of a RACH procedure performed with the UE or in association with a measurement report sent by the UE to the network (e.g., to a macro base station, a gNB, a macrocell, PCell, etc. or to a small cell, picocell, femtocell, microcell, SCell, etc.).

When the network is to configure one or more repetitions of control information on a control channel in association with a RACH procedure performed with the UE, the method 1600 may begin with operation 1602. At operation 1602, the base station may receive, from the UE, a RACH preamble associated with the RACH procedure.

The base station may receive the RACH preamble on a dedicated resource, and the base station may identify the UE based on the dedicated resource on which the RACH preamble is received.

For example, referring to FIG. 4C, the base station 432 may receive, from the UE 434, the MSG1 436, and the MSG1 436 may include a RACH preamble generated by the UE 434. Referring to FIG. 4D, the base station 432 may receive, from the UE 434, the RA preamble 444, which may be assigned to the UE 434 by the base station 432 according to the RA preamble assignment 442. Referring to FIG. 5, the first base station 502a or the second base station 502b may receive the RACH preamble from the UE 504 in association with the RACH procedure 520. In the context of FIG. 7, the first base station 502a or the second base station 502b may receive, from the UE 504, the preamble 712 in the RACH occasion 710. In the context of FIG. 11, the first base station 502a or the second base station 502b may receive, from the UE 504, the preamble 1112 in the RACH occasion 1110.

When the network is to configure one or more repetitions of control information on a control channel in association with a measurement report sent by the UE to the network, the method 1600 may begin with operation 1604. At operation 1604, the base station may receive, from a UE, a measurement report indicating one or more values associated with a channel quality on which the UE communicates with the base station or communicates with another base station (e.g., a small cell base station, such as a microcell, picocell, femtocell, etc.). For example, the base station or other base station may transmit one or more reference signals one on or more beams to the UE. Based on the one or more reference signals, the base station may receive a measurement report from the UE that indicates at least one of a SNR, SINR, RSRP, RSRQ, or another value indicative of channel and/or signal quality or power for at least one of the one or more reference signals.

For example, referring to FIG. 5, the first base station 502*a* may receive a report 514 (e.g., MeasResult) indicating measurement(s) 512 from the UE 504. Based on the report 514, the first base station 502*a* may determine whether to add the second base station 502*b* for the UE 504 (e.g., for dual connectivity). For example, the first base station 502*a* may compare the one or more measurement(s) 512 to a respective threshold. If the first base station 502*a* determines that the one or more measurement(s) 512 satisfy (e.g., meet or exceed) a respective threshold, then the first base station 502*a* may configure the UE 504 to add the second base station 502*b* for dual connectivity.

At operation 1606, the base station determine, for the UE, a first schedule associated with one or more repetitions of control information on a control channel. For example, the base station may determine a set of resources on which to send each of the one or more repetitions of the control information on the control channel. In some aspects, the control channel may be implemented as a PDCCH. According to one aspect, the base station may determine the first schedule associated with the one or more repetitions of the control information on the control channel based on a RACH preamble received from the UE. For example, the base station may determine at least one resource on which the RACH preamble is received from the UE (e.g., a dedicated resource), and the base station may identify the UE based on the at least one resource. Further to such an example, the base station may determine a number of repetitions of the control information on the control channel based on the identification of the UE. According to another aspect, the base station may determine the first schedule associated with the one or more repetitions of the control information on the control channel based on the measurement report received from the UE (as described with respect to operations 1622, 1624, infra).

The base station may differently determine the first schedule associated with the one or more repetitions of the control information on the control channel according to different aspects described herein. In one aspect, the base station may determine whether the one or more repetitions of the control information on the control channel is greater than one. In another aspect, the base station may determine that each of the one or more repetitions of the control information on the control channel has at least one of a same payload, a same aggregation level, or a same set of frequency resources. In still another aspect, the base station may determine a number of symbols associated with the one or more repetitions of the control information on the control channel, and a search space associated with the control channel may include a number of symbols per monitoring occasion that is a multiple of a CORESET carrying the control information on the control channel. In such an aspect, at least two of the one or more repetitions of the control information on the control channel may be across adjacent symbols per monitoring occasion.

In still a further aspect, the base station may determine a start time and a number of the one or more repetitions of the control information on the control channel for one or more time windows that include each of the one or more repetitions of the control information on the control channel. In such an aspect, at least two of the one or more repetitions of the control information on the control channel included in the one or more time windows may be across adjacent slots or across adjacent symbols.

In various other aspects, the base station may determine one or more indices associated with at least one common monitoring occasion that includes the one or more repetitions of the control information on the control channel, and the base station may further determine a number of the one or more repetitions of the control information on the control channel included in at least one common monitoring occasion. For example, the at least one common monitoring occasion may be associated with a respective schedule that is defined by a common search space configuration. According to one aspect of such an example, the common search space configuration may be indicated in at least one of a SIB or an IE associated with a configuration of common parameters associated with the control channel. In another example, at least two of the one or more repetitions of the control information on the control channel during at least one common monitoring occasion are across one of adjacent symbols or across adjacent slots.

For example, referring to FIG. 5, the first base station 502*a* or the second base station 502*b* may determine a first schedule associated with one or more repetitions of the MSG2 PDCCH 521*a* on a PDCCH. Referring to FIG. 6, the first base station 502*a* or the second base station 502*b* may determine a schedule 600 that includes one or more repetitions of the MSG2 PDCCH 608 over adjacent slots, and the MSG2 PDCCH 608 may occur in a set of resources that is associated with a CORESET 606. Referring to FIG. 7, the first base station 502*a* or the second base station 502*b* may determine a set of schedules 700, at least one of which may be associated with one or more repetitions of the MSG2 PDCCH 708 during a monitoring occasion 722 associated with the dedicated search space (e.g., a search space identity indicated by a "dedicated-ra-SeachSpace" entry). Referring to FIG. 8, the first base station 502*a* or the second base station 502*b* may determine a first schedule 800 that includes one or more repetitions of a MSG2 PDCCH 808 over adjacent symbols, and the MSG2 PDCCH 808 may occur in a set of resources that is associated with a CORESET 806. Referring to FIG. 9, the first base station 502*a* or the second base station 502*b* may determine a schedule 900 of a common configuration associated with a MSG2 PDCCH 908, and one or more repetitions of a MSG2 PDCCH 908 may occur in a CORESET 906 scheduled in at least one common monitoring occasion 904 for a search space configured for random access included in a slot n 912*a* of the slots 912*a-b*. Referring to FIG. 10, the first base station 502*a* or the second base station 502*b* may determine a schedule 1000 of one or more repetitions of a MSG2 PDCCH 1008 that are to occur in one or more common monitoring occasions 1004, such as a cell-specific monitoring occasion. Referring to FIG. 11, the first base station 502*a* or the second base station 502*b* may determine a least one of the schedules 1100 corresponding to one or more repetitions of the MSG2 PDCCH 1108 received in one or more common monitoring occasions 1122 in the response window

1120. Referring to FIG. 12, the first base station 502*a* or the second base station 502*b* may determine a schedule 1200 of one or more repetitions of the MSG2 PDCCH in adjacent symbols, and at least one of the MSG2 PDCCH 1208 may occur in a CORESET 1206 scheduled in a monitoring occasion 1204 for a search space configured for random access included in a slot n 1212*a*.

According to one aspect, operation 1606 may include operation 1622 and operation 1624. At operation 1624, the base station may determine whether at least one value included in the measurement received from the UE satisfies at least one threshold. For example, the base station may compare at least one value (e.g., SNR, SINR, RSRP, RSRQ, and the like) to a respective threshold, and the base station may determine whether the at least one value satisfies (e.g., meets or exceeds) the respective threshold. For example, referring to FIG. 5, the first base station 502*a* may compare at least one value, received from the UE 504 in the report 514 based on the one or more measurement(s) 512, with a respective threshold, and may determine whether the at least one value satisfies the respective threshold.

At operation 1624, the base station may determine a number of the one or more repetitions of the control information on the control channel based on whether the at least one value included in the received measurement report satisfies the respective threshold. For example, the base station may determine that the number of the one or more repetitions of the control information on the control channel by determining whether one or more values indicate that the UE is relatively far from the base station (e.g., near a cell edge, such as when the one or more values fail to satisfy the respective threshold), and the base station may determine that the number of repetitions is greater than one when the UE is determined to be relatively far from the base station. For example, referring to FIG. 5, the first base station 502*a* or the second base station 502*b* may determine a number of the one or more repetitions of the MSG2 PDCCH 521*a* based on one or more values associated with the measurement(s) 512 indicated in the report 514 received from the UE 504.

At operation 1608, the base station may send, to the UE, first information indicating the first schedule. According to various configurations, the base station may send, to the UE, the first information via at least one of RRC signaling, a MAC CE, or a DCI message. According to various other configurations, the base station may send, to the UE, the first information in at least one UE-specific IE that indicates the first information. In one aspect, the base station may send the first information on a first set of frequency resources, and the first set of frequency resources may be different from a second set of frequency resources on which each of the one or more repetitions of the control information on the control channel is to be sent.

The first information be differently configured according to different aspects described herein. In one aspect, the first information may indicate whether the one or more repetitions of the control information on the control channel is greater than one. In another aspect, the first information may indicate that each of the one or more repetitions of the control information on the control channel has at least one of a same payload, a same aggregation level, or a same set of frequency resources. In a third aspect, the first information may include a flag indicated by a search space IE, and at least two of the one or more repetitions of the control information on the control channel are across adjacent slots per monitoring occasion.

In still another aspect, the first information may include a number of symbols associated with the one or more repetitions of the control information on the control channel, and a search space associated with the control channel may include a number of symbols per monitoring occasion that is a multiple of a CORESET carrying the control information on the control channel. In such an aspect, at least two of the one or more repetitions of the control information on the control channel may be across adjacent symbols per monitoring occasion.

In still a further aspect, the first information may indicate a start time and a number of the one or more repetitions of the control information on the control channel for one or more time windows that include each of the one or more repetitions of the control information on the control channel. In such an aspect, at least two of the one or more repetitions of the control information on the control channel included in the one or more time windows may be across adjacent slots or across adjacent symbols.

In various other aspects, the first information may indicate one or more indices associated with at least one common monitoring occasion that includes the one or more repetitions of the control information on the control channel, and the first information may further indicate a number of the one or more repetitions of the control information on the control channel included in at least one common monitoring occasion. For example, the at least one common monitoring occasion may be associated with a respective schedule that is defined by a common search space configuration. According to one aspect of such an example, the common search space configuration may be indicated in at least one of a SIB or an IE associated with a configuration of common parameters associated with the control channel. In another example, at least two of the one or more repetitions of the control information on the control channel during at least one common monitoring occasion are across one of adjacent symbols or across adjacent slots.

For example, referring to FIG. 5, the first base station 502*a* or the second base station 502*b* may send, to the UE 504, the configuration information 516. The configuration information 516 may be associated with one or more repetitions of the MSG2 PDCCH 521*a* on a control channel, such as a PDCCH.

In some aspects, another base station may be configured to perform a RACH procedure with the UE. In such aspects, the method 1600 may include operation 1610. At operation 1610, the base station may configure another base station for the UE. For example, the base station may configure the UE (e.g., for dual connectivity) by adding the other base station as an SCell, while the base station may be a PCell for the UE. The base station may provide information identifying the UE to the other base station. Accordingly, the base station may add the other base station as another cell (e.g., small cell) for the UE.

In some aspects, the base station may configure the other base station to perform a RACH procedure with the UE. Accordingly, the other base station may be configured to send an RAR on a data channel, e.g., based on the second schedule. For example, the other base station may receive a RACH preamble from the UE (e.g., as described at operation 1602, supra), for example, after the base station has added the other base station for the UE based on at least one measurement report received from the UE (e.g., as described at operation 1604, supra).

For example, referring to FIG. 5, the first base station 502*a* may add the second base station 502*b* for the UE (e.g., for dual connectivity). Accordingly, the second base station 502*b* may be configured to perform the RACH procedure 520, including sending the MSG2 521*b* on a PDSCH to the UE 504 based on a schedule indicated in the MSG2 PDCCH 521*a*.

At operation 1612, the base station or the other base station may send, to the UE, the control information on each of the one or more repetitions based on the first schedule. The control information may indicate a second schedule associated with an RAR (also referred to as a MSG2) on a data channel. For example, the data channel may be a PDSCH.

For example, referring to FIG. 5, the first base station 502*a* or the second base station 502*b* may send the one or more repetitions of the MSG2 PDCCH 521*a* on the PDCCH. Each of the one or more repetitions of the MSG2 PDCCH 521*a* may indicate a second schedule associated with the MSG2 521*b* to be received on the PDSCH. Referring to FIG. 6, the first base station 502*a* or the second base station 502*b* may send one or more repetitions of the MSG2 PDCCH 608 in at least each of the slots n through n+1 612*a-b*. Referring to FIG. 7, the first base station 502*a* or the second base station 502*b* may send one or more repetitions of the MSG2 PDCCH 708 in the monitoring occasions 722 in the response window 720. Referring to FIG. 8, the first base station 502*a* or the second base station 502*b* may send one or more repetitions of the MSG2 PDCCH 808 in at least one of the monitoring occasions 810*a-b*. Referring to FIG. 9, the first base station 502*a* or the second base station 502*b* may send one or more repetitions of the MSG2 PDCCH 908 in at least one common monitoring occasion 904, which may be carried in the CORESET 906. Referring to FIG. 10, the first base station 502*a* or the second base station 502*b* may send one or more repetitions of the MSG2 PDCCH 1008 in the common monitoring occasions 1004, which may be carried in the CORESET 1006. Referring to FIG. 11, the first base station 502*a* or the second base station 502*b* may send one or more repetitions of the MSG2 PDCCH 1108 in the common monitoring occasions 1122 in the response window 1120. Referring to FIG. 12, the first base station 502*a* or the second base station 502*b* may send one or more repetitions of the MSG2 PDCCH 1208 in at least one common monitoring occasion 1204.

At operation 1614, the base station or the other base station may send, to the UE, the RAR on the data channel based on the second schedule. For example, the base station or the other base station may send the RAR in response to a RACH preamble received from the UE. The base station may then proceed with the RACH procedure, such as by receiving a MSG 3 from the UE and sending a MSG4 to the UE based on the MSG 3. In various aspects, the data channel may be a PDSCH.

For example, referring to FIG. 4C, the base station 432 may send, to the UE 434, the MSG2 437. Referring to FIG. 4D, the base station 432 may send, to the UE 434, the random access response 446. Referring to FIG. 5, the first base station 502*a* or the second base station 502*b* may send, to the UE 504, the MSG2 521*b* (also known as the RAR) on the PDSCH.

Figure 17:
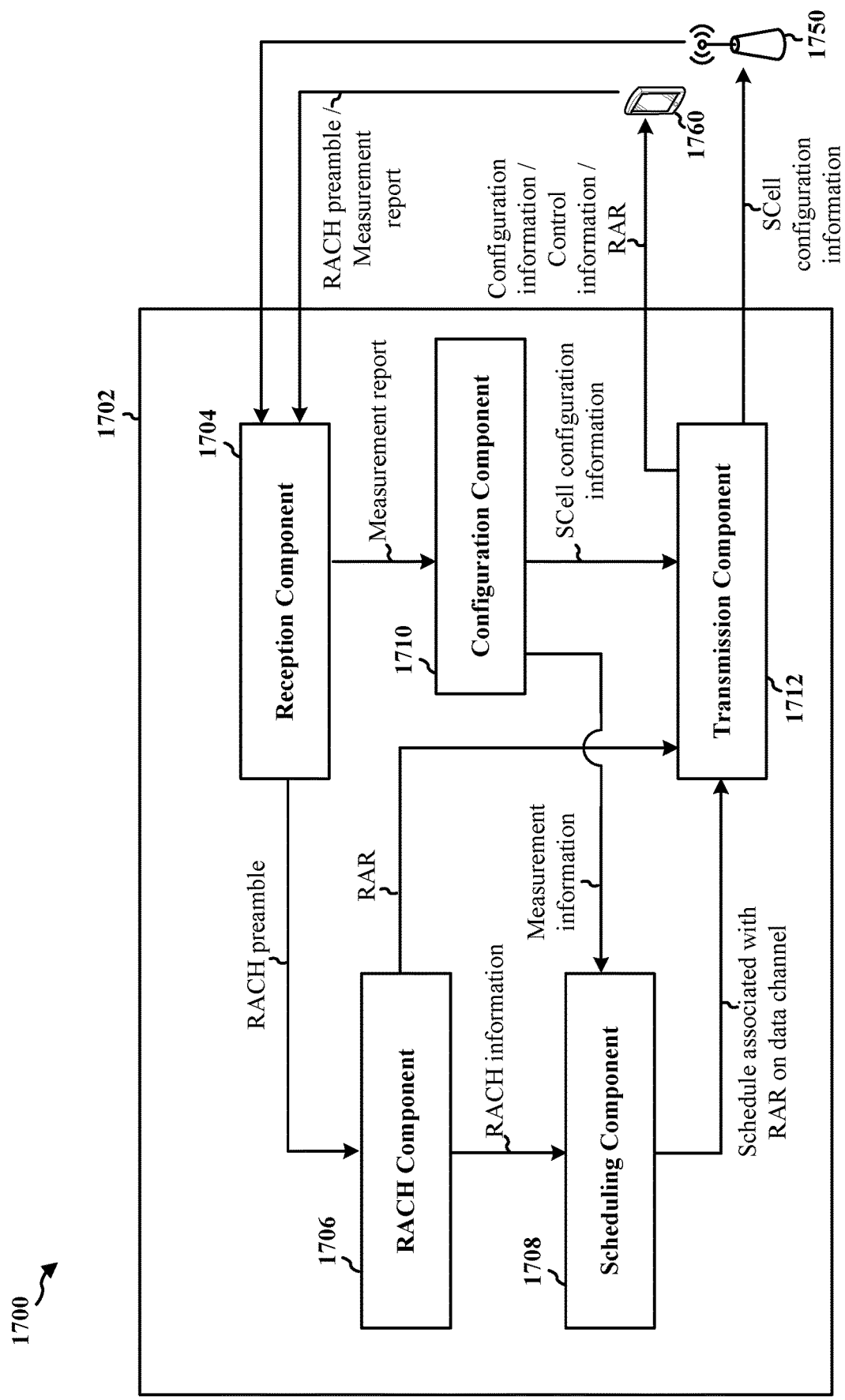
FIG. 17 is a conceptual data flow diagram illustrating the data flow between different means/components in an example apparatus, in accordance with various aspects of the present disclosure.

FIG. 17 is a conceptual data flow diagram 1700 illustrating the data flow between different means/components in an example apparatus 1702. The apparatus 1702 may be a base station. The apparatus 1702 may include a reception component 1704 that is configured to receive signals from another base station 1750 and/or a UE 1760. The apparatus 1702 may further include a transmission component 1712 that is configured to transmit signals to the other base station 1750 and/or the UE 1760.

According to one aspect, the reception component 1704 may receive, from the UE 1760, a RACH preamble associated with a RACH procedure, e.g., as described at operation 1602 of FIG. 16. The apparatus 1702 may include a RACH component 1706 configured to assign at least one dedicated resource to the UE 1760 in association with the RACH preamble. The reception component 1704 may receive the RACH preamble from the UE 1760 on the at least one dedicated resource. The reception component 1704 may provide the RACH preamble to the RACH component 1706.

According to another aspect, the reception component 1704 may receive, from the UE 1760, a measurement report, e.g., as described at operation 1604 of FIG. 16. For example, the measurement report may indicate one or more measurements associated with one or more reference signals transmitted by the apparatus 1702 or transmitted by the other base station 1750. The reception component 1704 may provide the measurement report to a configuration component 1710.

The configuration component 1710 may be configured to determine whether at least one value included in the measurement report satisfies at least one threshold, e.g., as described at operation 1622 of FIG. 16. Based on whether the at least one value included in the measurement report satisfies the at least one threshold, the configuration component 1710 may indicate, to a scheduling component 1708, whether the UE 1760 is relative close to the apparatus 1702 or the other base station 1750 (e.g., depending on whether the one or more measurements are based on reference signals received from the apparatus 1702 or received from the other base station 1750, respectively).

In some aspects, the configuration component 1710 may configure the other base station 1750 for the UE 1760, e.g., as described at operation 1610 of FIG. 16. For example, the configuration component 1710 may configure the other base station 1750 for the UE 1760 based on whether at least one value included in the measurement report satisfies the at least one threshold. In some aspects, the configuration component 1710 may configure the other base station 1750 to be added for the UE 1760 as an SCell. The configuration component 1710 may configure the other base station 1750 for a RACH procedure with the UE 1760, such as by configuring the other base station 1750 to send an RAR to the UE 1760, e.g., based on a second schedule determined by the scheduling component 1708 or the other base station 1750. The configuration component 1710 may provide, to the transmission component 1712, SCell configuration information that configures the other base station 1750 to be added as an SCell for the UE 1760.

The scheduling component 1708 may be configured to determine, for the UE 1760, a first schedule associated with one or more repetitions of control information on a control channel, e.g., as described at operation 1606 of FIG. 16. For example, the scheduling component 1708 may determine the first schedule by determining a set of resources on which to send each of the one or more repetitions of the control information on the control channel.

In one aspect, the scheduling component 1708 may determine the first schedule associated with the one or more repetitions of the control information on the control channel based on the measurement report received from the UE 1760. For example, the scheduling component 1708 may determine the number of the one or more repetitions of the control information on the control channel based on whether the at least one value included in the measurement report satisfies the at least one threshold, e.g., as described at operation 1624 of FIG. 16. According to another example, the scheduling component 1708 may determine the first schedule associated with the one or more repetitions of the control information on the control channel based on a RACH preamble received from the UE 1760. For example, the scheduling component 1708 may determine at least one resource on which the RACH preamble is received from the UE 1760 (e.g., a dedicated resource), and the scheduling component 1708 may identify the UE 1760 based on the at least one resource. Further to such an example, the scheduling component 1708 may determine a number of repetitions of the control information on the control channel based on the identification of the UE 1760.

The scheduling component 1708 may differently determine the first schedule associated with the one or more repetitions of the control information on the control channel according to different aspects described herein. In one aspect, the scheduling component 1708 may determine whether the one or more repetitions of the control information on the control channel is greater than one. In another aspect, the scheduling component 1708 may determine that each of the one or more repetitions of the control information on the control channel has at least one of a same payload, a same aggregation level, or a same set of frequency resources. In still another aspect, the scheduling component 1708 may determine a number of symbols associated with the one or more repetitions of the control information on the control channel, and a search space associated with the control channel may include a number of symbols per monitoring occasion that is a multiple of a CORESET carrying the control information on the control channel. In such an aspect, at least two of the one or more repetitions of the control information on the control channel may be across adjacent symbols per monitoring occasion.

In still a further aspect, the scheduling component 1708 may determine a start time and a number of the one or more repetitions of the control information on the control channel for one or more time windows that include each of the one or more repetitions of the control information on the control channel. In such an aspect, at least two of the one or more repetitions of the control information on the control channel included in the one or more time windows may be across adjacent slots or across adjacent symbols.

In various other aspects, the scheduling component 1708 may determine one or more indices associated with at least one common monitoring occasion that includes the one or more repetitions of the control information on the control channel, and the scheduling component 1708 may further determine a number of the one or more repetitions of the control information on the control channel included in at least one common monitoring occasion. For example, the at least one common monitoring occasion may be associated with a respective schedule that is defined by a common search space configuration. According to one aspect of such an example, the common search space configuration may be indicated in at least one of a SIB or an IE associated with a configuration of common parameters associated with the control channel. In another example, at least two of the one or more repetitions of the control information on the control channel during at least one common monitoring occasion are across one of adjacent symbols or across adjacent slots.

The scheduling component 1708 may provide the first schedule to the transmission component 1712. The transmission component 1712 may send, to the UE 1760, first information (e.g., configuration information) indicating the first schedule, as described at operation 1608 of FIG. 16. According to various aspects, the transmission component 1712 may send the first information via at least one of RRC signaling, a MAC CE, or a DCI message. In another aspect, the transmission component 1712 may indicate the first information in at least one UE-specific IE.

In one aspect, the first information may indicate whether the number of the one or more repetitions of the control information on the control channel is greater than one. In another aspect, the first information may indicate that each of the one or more repetitions of the control information on the control channel has at least one of a same payload, a same aggregation level, or a same set of frequency resources. In a further aspect, the first information may include a flag indicated by a search space IE, and at least two of the one or more repetitions of the control information on the control channel may be across adjacent slots.

In still another aspect, the first information may include a number of symbols associated with the one or more repetitions of the control information on the control channel. In such an aspect, a search space associated with the control channel may include a number of symbols per monitoring occasion that is a multiple of a CORESET carrying the control information on the control channel, and at least two of the one or more repetitions of the control information on the control channel are across adjacent symbols per monitoring occasion.

In another aspect, the first information may indicate a start time and a number of the one or more repetitions of the control information on the control channel for one or more time windows that include the one or more repetitions of the control information on the control channel. In such an aspect, at least two of the one or more repetitions of the control information on the control channel included in the one or more time windows are across one of adjacent slots or adjacent symbols.

In a further aspect, the first information may indicate one or more indices associated with at least one common monitoring occasion that includes the one or more repetitions of the control information on the control channel, and the first information may further indicate a number of the one or more repetitions of the control information on the control channel included in at least one common monitoring occasion. For example, the at least one common monitoring occasion may be associated with a respective schedule that is defined by a common search space configuration. The common search space configuration may be indicated by at least one of a SIB or an IE associated with a configuration of common parameters associated with the control channel. In some aspects, at least two of the one or more repetitions of the control information on the control during at least one common monitoring occasion are across one of adjacent slots or adjacent symbols.

In association with the first information, the scheduling component 1708 may determine a second schedule associated with the RAR. The scheduling component 1708 may provide the second schedule to the transmission component 1712. Further, the scheduling component 1708 may indicate a number of the one or more repetitions of the control information on the control channel to the transmission component 1712.

The transmission component 1712 may send, to the UE 1760, each of the one or more repetitions of the control information on the control channel based on the first schedule, e.g., as described at operation 1612 of FIG. 16. The control information may indicate a second schedule associated with a RAR on a data channel (e.g., a PDSCH). For example, the control information may be a MSG2 PDCCH that indicates a set of resources on which the RAR (or MSG2) is carried.

In one aspect, the RACH component 1706 may generate the RAR based on the RACH preamble received from the UE 1760. In such an aspect, the RACH component 1706 may provide the RAR to the transmission component 1712. The transmission component 1712 may send, to the UE 1760, the RAR on the data channel based on the second schedule, e.g., as described at operation 1614 of FIG. 16.

In another aspect, the other base station 1750 may send the RAR to the UE 1760. For example, the apparatus 1702 may configure the other base station 1750 to perform a RACH procedure with the UE 1760.

The apparatus may include additional components that perform each of the blocks of the algorithm in the aforementioned flowcharts of FIG. 16. As such, each block in the aforementioned flowcharts of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
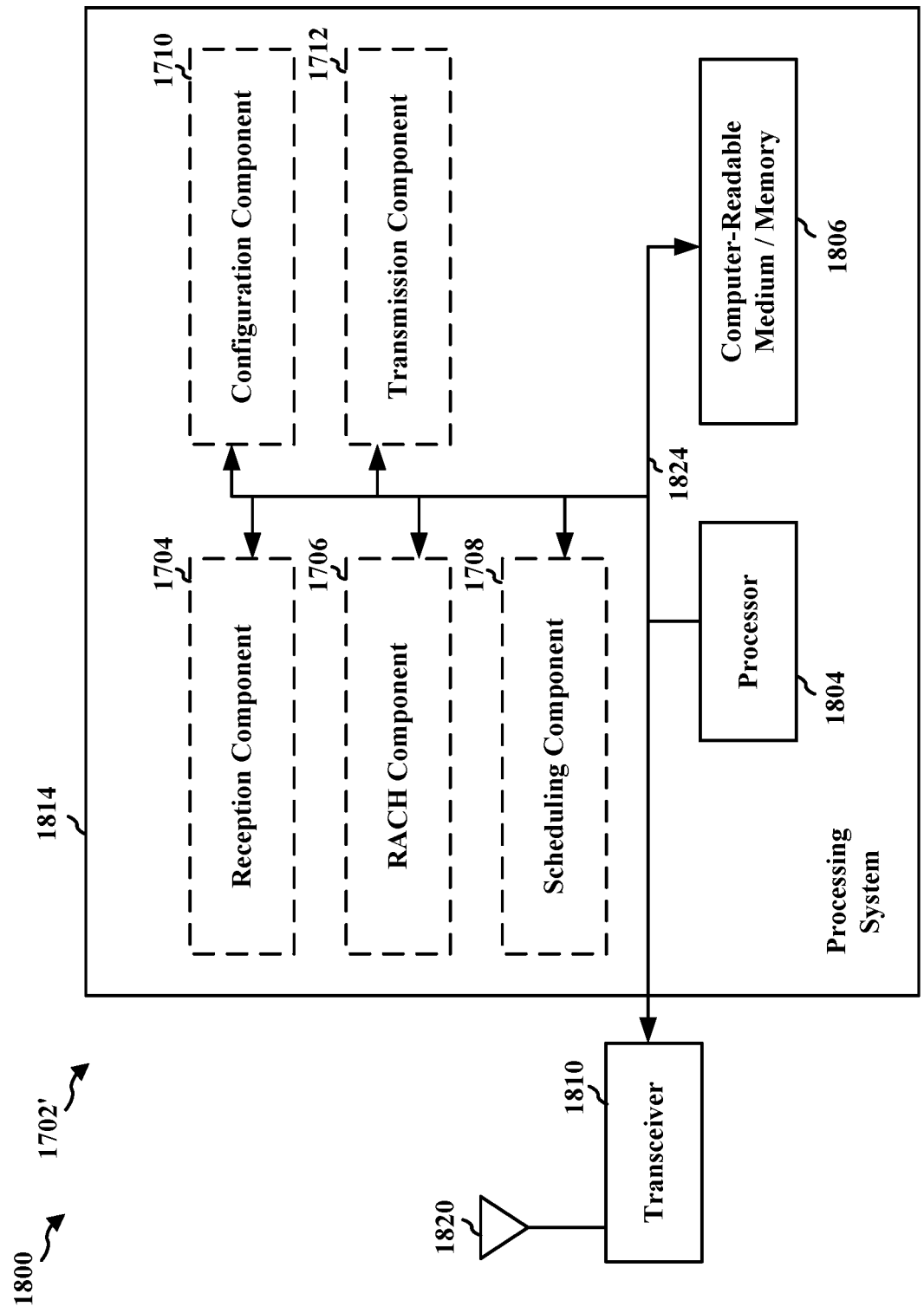
FIG. 18 is a diagram illustrating an example of a hardware implementation for an apparatus employing a processing system, in accordance with various aspects of the present disclosure.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712 and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1712, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 and/or at least one of the TX processor 316, the RX processor 370, and the controller/processor 375. Alternatively, the processing system 1814 may be the entire base station (e.g., see 310 of FIG. 3).

In one configuration, the apparatus 1702/1702' for wireless communication includes means for determining, for a UE, a first schedule associated with one or more repetitions of control information on a control channel. The apparatus 1702/1702' includes means for sending, to the UE, first information indicating the first schedule. The apparatus 1702/1702' includes means for sending, to the UE, each of the one or more repetitions of the control information on the control channel based on the first schedule, wherein the control information indicates a second schedule associated with a RAR on a data channel.

In one aspect, the apparatus 1702/1702' may include means for sending, to the UE, the RAR on the data channel based on the second schedule associated with the RAR. In another aspect, the apparatus 1702/1702' may include means for configuring a second base station for the UE, wherein the second base station is to send the RAR to the UE on the data channel based on the second schedule associated with the RAR.

In one aspect, a number of the one or more repetitions of the control information on the control channel is determined based on at least one of a RACH preamble received from the UE or a measurement report received from the UE.

In one aspect, the means for determining the first schedule associated with the one or more repetitions of the control information on the control channel is configured to determine whether at least one value included in the measurement report satisfies at least one threshold, and determine the number of the one or more repetitions of the control information on the control channel based on whether the at least one value included in the measurement report satisfies the at least one threshold.

In one aspect, the first information indicates whether a number of the one or more repetitions of the control information on the control channel is greater than one. In another aspect, the first information indicates each of the one or more repetitions of the control information on the control channel has at least one of a same payload, a same aggregation level, or a same set of frequency resources. In a further aspect, the first information comprises a flag indicated by a search space IE, and at least two of the one or more repetitions of the control information on the control channel are across adjacent slots per monitoring occasion.

In one aspect, the first information comprises a number of symbols associated with the one or more repetitions of the control information on the control channel, and wherein a search space associated with the control channel comprises a number of symbols per monitoring occasion that is a multiple of a CORESET carrying the control information on the control channel, and at least two of the one or more repetitions of the control information on the channel are across adjacent symbols per monitoring occasion. In another aspect, the first information indicates a start time and a number of the one or more repetitions of the control information on the control channel for one or more time windows that include the one or more repetitions of the control information on the control channel. In an further aspect, at least two of the one or more repetitions of the control information on the control channel included in the one or more time windows are across one of adjacent slots or adjacent symbols.

In one aspect, the first information is sent via at least one of RRC signaling, a MAC CE, or a DCI message. In another aspect, the first information is sent one a first set of frequency resources that is different from a second set of frequency resources on which the one or more repetitions of the control information on the control channel is sent.

In one aspect, the first information indicates one or more indices associated with at least one common monitoring occasion that includes the one or more repetitions of the control information on the control channel, and the first information further indicates a number of the one or more repetitions of the control information on the control channel included in at least one common monitoring occasion. In a further aspect, the at least one common monitoring occasion is associated with a respective schedule that is defined by a common search space configuration. In still a further aspect, the common search space configuration is indicated by at least one of a SIB or an IE associated with a configuration of common parameters associated with the control channel. In another aspect, the first information is indicated in at least one UE-specific IE. In another aspect, at least two of the one or more repetitions of the control information on the control channel during at least one common monitoring occasion are across one of adjacent slots or adjacent symbols. In one aspect, the control channel comprises a PDCCH, and the data channel comprises a PDSCH.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving one of a set of repetitions of control information in a 5G New Radio (NR) frame structure scheduling a message;
   determining a schedule for receiving the message based on an index associated with receiving the one of the set of repetitions of the control information; and
   receiving the message based on the schedule,
   wherein the schedule for receiving the message comprises a starting symbol including a portion of the message, and the starting symbol is offset from a first symbol of a slot including the control information.

2. The method of claim 1, wherein the index associated with the one of the set of repetitions of the control information comprises a slot index corresponding to a last repetition of the control information.

3. The method of claim 1, wherein the schedule for receiving the message comprises a starting symbol including a portion of the message, and the starting symbol is based on the index associated with receiving the one of the set of repetitions of the control information and an offset from the index.

4. The method of claim 1, further comprising:
   receiving information scheduling a set of monitoring occasions that include the set of repetitions of the control information.

5. The method of claim 1, wherein the control information is carried on a physical downlink control channel (PDCCH), and the message is carried on a physical downlink shared channel (PDSCH).

6. The method of claim 1, further comprising:
   receiving a search space information element (IE) indicating a number of the set of repetitions of the control information.

7. The method of claim 1, wherein the message is associated with a random access channel (RACH) procedure and comprises a random access response (RAR) message or a MSG2 message.

8. A method of wireless communication at a network node, comprising:
   transmitting, to a user equipment (UE), a set of repetitions of control information in a 5G New Radio (NR) frame structure scheduling a message from a starting symbol that is based on an index associated with transmitting one of the repetitions of the control information and an offset from the index; and transmitting, to the UE, the message based on an index associated with transmitting one of the repetitions of the control information,
wherein the offset is from a first symbol of a slot including the control information.

9. The method of claim 8, wherein the index associated with the one of the set of repetitions of the control information comprises a slot index corresponding to a last repetition of the control information.

10. The method of claim 8, further comprising:
transmitting, to the UE, information scheduling a set of monitoring occasions that include the set of repetitions of the control information.

11. The method of claim 8, wherein the control information is carried on a physical downlink control channel (PDCCH), and the message is carried on a physical downlink shared channel (PDSCH).

12. The method of claim 11, further comprising:
transmitting, to the UE, a search space information element (IE) indicating a number of the set of repetitions of the control information.

13. The method of claim 8, wherein the message is associated with a random access channel (RACH) procedure and comprises a random access response (RAR) message or a MSG2 message.

14. An apparatus for wireless communication at a user equipment (UE), comprising:
a memory; and
at least one processor coupled to the memory and configured to:
receive one of a set of repetitions of control information in a 5G New Radio (NR) frame structure scheduling a message;
determine a schedule for receiving the message based on an index associated with receiving the one of the set of repetitions of the control information; and
receive the message based on the schedule,
wherein the schedule for receiving the message comprises a starting symbol including a portion of the message, and the starting symbol is offset from a first symbol of a slot including the control information.

15. The apparatus of claim 14, wherein the index associated with the one of the set of repetitions of the control information comprises a slot index corresponding to a last repetition of the control information.

16. The apparatus of claim 14, wherein the schedule for receiving the message comprises a starting symbol including a portion of the message, and the starting symbol is based on the index associated with receiving the one of the set of repetitions of the control information and an offset from the index.

17. The apparatus of claim 14, wherein the at least one processor is further configured to:
receive information scheduling a set of monitoring occasions that include the set of repetitions of the control information.

18. The apparatus of claim 14, wherein the control information is carried on a physical downlink control channel (PDCCH), and the message is carried on a physical downlink shared channel (PDSCH).

19. The apparatus of claim 18, wherein the at least one processor is further configured to:
receive a search space information element (IE) indicating a number of the set of repetitions of the control information.

20. The apparatus of claim 14, wherein the message is associated with a random access channel (RACH) procedure and comprises a random access response (RAR) message or a MSG2 message.

21. An apparatus of wireless communication at a network node, comprising:
a memory; and
at least one processor coupled to the memory and configured to:
transmit, to a user equipment (UE), a set of repetitions of control information in a 5G New Radio (NR) frame structure scheduling a message from a starting symbol that is based on an index associated with transmitting one of the repetitions of the control information and an offset from the index; and
transmit, to the UE, the message based on an index associated with transmitting one of the repetitions of the control information,
wherein the offset is from a first symbol of a slot including the control information.

22. The apparatus of claim 21, wherein the index associated with the one of the set of repetitions of the control information comprises a slot index corresponding to a last repetition of the control information.

23. The apparatus of claim 21, wherein the at least one processor is further configured to:
transmit, to the UE, information scheduling a set of monitoring occasions that include the set of repetitions of the control information.

24. The apparatus of claim 21, wherein the control information is carried on a physical downlink control channel (PDCCH), and the message is carried on a physical downlink shared channel (PDSCH).

* * * * *